United States Patent
Walia et al.

(10) Patent No.: US 8,529,821 B2
(45) Date of Patent: Sep. 10, 2013

(54) POLYMERIC COMPOSITIONS AND FILLED TPO ARTICLES HAVING IMPROVED AESTHETICS

(75) Inventors: Parvinder Walia, Midland, MI (US); Franciscus Krabbenborg, Holland (NL)

(73) Assignee: Dow Global Technologies LLC, Midland, MI (US)

( * ) Notice: Subject to any disclaimer, the term of this patent is extended or adjusted under 35 U.S.C. 154(b) by 284 days.

(21) Appl. No.: 13/142,966

(22) PCT Filed: Jan. 29, 2010

(86) PCT No.: PCT/US2010/022539
§ 371 (c)(1),
(2), (4) Date: Jun. 30, 2011

(87) PCT Pub. No.: WO2010/088488
PCT Pub. Date: Aug. 5, 2010

(65) Prior Publication Data
US 2011/0272860 A1   Nov. 10, 2011

Related U.S. Application Data

(60) Provisional application No. 61/148,549, filed on Jan. 30, 2009.

(51) Int. Cl.
*B29C 45/00* (2006.01)
*C08F 210/06* (2006.01)
*C08L 23/10* (2006.01)

(52) U.S. Cl.
USPC ...... 264/328.18; 524/451; 524/528; 525/240; 525/323

(58) Field of Classification Search
USPC ............ 264/328.18; 524/451, 528; 525/240, 525/323
See application file for complete search history.

(56) References Cited

U.S. PATENT DOCUMENTS

| 3,005,795 | A | 10/1961 | MacDonald et al. |
| 3,142,665 | A | 7/1964 | Cardinal et al. |

(Continued)

FOREIGN PATENT DOCUMENTS

| EP | 0 129 368 | 12/1984 |
| EP | 0 260 999 A1 | 9/1987 |

(Continued)

OTHER PUBLICATIONS

International Search Report for PCT/US2010/022539 mailed on Apr. 20, 2010.

(Continued)

*Primary Examiner* — Jill Heitbrink
(74) *Attorney, Agent, or Firm* — The Dobrusin Law Firm, P.C.

(57) ABSTRACT

The present invention relates to filled polymeric compositions, such as filled TPO compositions, having improved aesthetics, and to polymeric masterbatches which may be used to prepare the improved filled TPO compositions. The present invention also relates to processes for preparing the filled TPO compositions which eliminates a compounding step. The polymeric compositions of the present invention include at least about 5 weight percent inorganic filler based on the total weight of the polymeric composition; a high viscosity polypropylene impact copolymer having a highly crystalline portion, wherein the highly crystalline portion is present from about 20 weight percent to about 90 weight percent of the high viscosity polypropylene impact copolymer, and a xylene soluble portion, wherein the xylene soluble portion is present from about 10 weight percent to about 80 weight percent of the high viscosity polypropylene impact copolymer and has a z-average molecular weight greater than about 1,500,000 Da, a number average molecular weight less than about 100,000 Da, and a polydispersity index greater than about 5; and a low viscosity substantially linear ethylene polymer having a polydispersity index less than about 3.5, and a melt flow rate greater than about 40 g/10 min as measured according to ASTM D-1238 at 190° C./2.16 kg.

20 Claims, 7 Drawing Sheets

(56) References Cited

U.S. PATENT DOCUMENTS

| | | |
|---|---|---|
| 3,236,917 A | 2/1966 | Natta et al. |
| 3,645,992 A | 2/1972 | Elston |
| 3,654,219 A | 4/1972 | Boyer et al. |
| 3,671,487 A | 6/1972 | Abolins |
| 3,682,443 A | 8/1972 | Upmeier |
| 3,746,489 A | 7/1973 | Rizzi et al. |
| 3,797,707 A | 3/1974 | Jenike et al. |
| 4,016,345 A | 4/1977 | Holmes |
| 4,286,883 A | 9/1981 | Johanson |
| 4,463,130 A | 7/1984 | Serini et al. |
| 4,698,378 A | 10/1987 | Wehrli et al. |
| 4,701,432 A | 10/1987 | Welborn, Jr. |
| 4,732,926 A | 3/1988 | Faulkner |
| 4,935,397 A | 6/1990 | Chang |
| 4,937,299 A | 6/1990 | Ewen et al. |
| 4,937,301 A | 6/1990 | Chang |
| 5,055,438 A | 10/1991 | Canich |
| 5,130,076 A | 7/1992 | Blatz et al. |
| 5,194,509 A | 3/1993 | Hasenbein et al. |
| 5,272,236 A | 12/1993 | Lai et al. |
| 5,278,272 A | 1/1994 | Lai et al. |
| 5,468,808 A | 11/1995 | Peacock |
| 5,599,099 A | 2/1997 | Bullivant |
| 6,102,562 A | 8/2000 | Bengtson |
| 6,111,206 A | 8/2000 | Maguire |
| 6,177,515 B1 | 1/2001 | Smith et al. |
| 6,187,424 B1 | 2/2001 | Kjellqvist et al. |
| 6,251,997 B1 | 6/2001 | Imai et al. |
| 6,254,956 B1 | 7/2001 | Kjellqvist et al. |
| 6,262,161 B1 | 7/2001 | Betso et al. |
| 6,297,301 B1 | 10/2001 | Erderly et al. |
| 6,300,419 B1 | 10/2001 | Sehanobish et al. |
| 6,329,454 B1* | 12/2001 | Krabbenborg ............... 524/252 |
| 6,403,691 B1 | 6/2002 | Zanka et al. |
| 6,403,692 B1 | 6/2002 | Traugott et al. |
| 6,417,240 B1 | 7/2002 | Park |
| 6,441,081 B1 | 8/2002 | Sadatoshi et al. |
| 6,525,157 B2 | 2/2003 | Cozewith et al. |
| 6,586,531 B2 | 7/2003 | Washiyama et al. |
| 6,689,841 B2 | 2/2004 | Jung et al. |
| 6,710,145 B2 | 3/2004 | Sonnenschein et al. |
| 6,713,578 B2 | 3/2004 | Sonnenschein et al. |
| 6,713,579 B2 | 3/2004 | Sonnenschein et al. |
| 6,730,759 B2 | 5/2004 | Sonnenschein et al. |
| 6,734,253 B2 | 5/2004 | Krabbenborg et al. |
| 6,806,330 B1 | 10/2004 | Sonnenschein et al. |
| 6,869,993 B2 | 3/2005 | Watanabe et al. |
| 6,949,603 B2 | 9/2005 | Sonnenschein et al. |
| 6,951,900 B2 | 10/2005 | Blanchard et al. |
| 6,967,225 B2 | 11/2005 | Mcenhill et al. |
| 7,268,185 B2 | 9/2007 | Shimojo et al. |
| 7,271,202 B2 | 9/2007 | Krabbenborg et al. |
| 7,732,521 B2 | 6/2010 | Wevers et al. |
| 2002/0061976 A1 | 5/2002 | Krabbenborg et al. |
| 2002/0072328 A1 | 6/2002 | Guirauton et al. |
| 2002/0121716 A1 | 9/2002 | Welsh et al. |
| 2003/0204017 A1 | 10/2003 | Stevens et al. |
| 2003/0212159 A1 | 11/2003 | Martinez et al. |
| 2003/0229169 A1 | 12/2003 | Han |
| 2004/0014891 A1* | 1/2004 | Krabbenborg et al. ....... 525/191 |
| 2004/0044107 A1 | 3/2004 | Kikuchi |
| 2004/0048967 A1 | 3/2004 | Tomomatsu et al. |
| 2005/0004332 A1 | 1/2005 | Jialanella et al. |
| 2005/0046367 A1 | 3/2005 | Wevers et al. |
| 2005/0049346 A1 | 3/2005 | Blanchard et al. |
| 2005/0070673 A1 | 3/2005 | Novak |
| 2005/0100754 A1 | 5/2005 | Moncla et al. |
| 2005/0116390 A1 | 6/2005 | Watson et al. |
| 2005/0137370 A1 | 6/2005 | Jialanella et al. |
| 2005/0154101 A1 | 7/2005 | Mcenhill et al. |
| 2005/0250890 A1 | 11/2005 | Chen et al. |
| 2006/0052541 A1* | 3/2006 | Hagen et al. ............... 525/240 |
| 2006/0058434 A1 | 3/2006 | Watanabe |
| 2007/0117909 A1 | 5/2007 | Seliskar et al. |
| 2007/0141323 A1 | 6/2007 | Wevers et al. |
| 2007/0246862 A1 | 10/2007 | Jones et al. |
| 2008/0009586 A1 | 1/2008 | VanSumeren et al. |
| 2008/0045645 A1 | 2/2008 | Seliskar et al. |
| 2008/0058455 A1 | 3/2008 | Wevers et al. |
| 2008/0169055 A1 | 7/2008 | Seliskar et al. |
| 2009/0105397 A1 | 4/2009 | Van Riel et al. |
| 2009/0105404 A1 | 4/2009 | Van Riel et al. |
| 2010/0168323 A1* | 7/2010 | Ito et al. ..................... 524/577 |
| 2011/0001265 A1 | 1/2011 | Walia et al. |
| 2011/0014407 A1* | 1/2011 | Doufas ..................... 428/36.91 |

FOREIGN PATENT DOCUMENTS

| | | |
|---|---|---|
| EP | 0 472 949 A1 | 3/1992 |
| EP | 0 495 099 A1 | 7/1992 |
| EP | 0 636 613 A1 | 2/1995 |
| EP | 0 987 091 A1 | 3/2000 |
| EP | 0 958 118 B1 | 4/2003 |
| EP | 1 498 173 A2 | 1/2005 |
| EP | 1 533 022 A2 | 5/2005 |
| JP | 57-179224 A | 11/1982 |
| JP | 9124857 A | 5/1997 |
| JP | 2004-042416 A | 2/2004 |
| JP | 2004-168879 A | 6/2004 |
| JP | 2004-168957 A | 6/2004 |
| JP | 2005-178146 A | 7/2005 |
| WO | 90/07526 | 7/1990 |
| WO | 93-18900 A1 | 9/1993 |
| WO | 97-21528 A1 | 6/1997 |
| WO | 98-46672 A2 | 10/1998 |
| WO | 99-07785 A1 | 2/1999 |
| WO | 00/77335 A1 | 12/2000 |
| WO | 01-12708 A1 | 2/2001 |
| WO | 01/42344 A1 | 6/2001 |
| WO | 01-57120 A2 | 8/2001 |
| WO | 01-58988 A | 8/2001 |
| WO | 02-22731 A2 | 3/2002 |
| WO | 02/085972 A | 10/2002 |
| WO | 03-040201 A1 | 5/2003 |
| WO | 2004/009657 A1 | 1/2004 |
| WO | 2004-031292 A2 | 4/2004 |
| WO | 2004-056545 A1 | 7/2004 |
| WO | 2005/083721 A1 | 9/2005 |
| WO | 2005/111145 A | 11/2005 |
| WO | 2006-047376 A1 | 5/2006 |
| WO | 2006/101932 A2 | 9/2006 |
| WO | 2006/101966 A1 | 9/2006 |
| WO | 2006/102155 A2 | 9/2006 |
| WO | 2007/002435 A1 | 1/2007 |
| WO | 2007-024541 A2 | 3/2007 |
| WO | 2007-078536 A1 | 7/2007 |
| WO | 2007-078537 A1 | 7/2007 |
| WO | 2008/002841 A2 | 1/2008 |
| WO | 2008/020925 A1 | 2/2008 |
| WO | 2008/085649 A1 | 7/2008 |
| WO | 2009/114761 A2 | 9/2009 |

OTHER PUBLICATIONS

International Preliminary Report on Patentability for PCT/US2010/022539 mailed on Aug. 11, 2011.
International Search Report PCT/US2007/067363, Aug. 22, 2007.
International Preliminary Report on Patentability, Dated Jul. 25, 2008, International Application No. PCT/US2007/067363.
International Search Report for PCT/US2009/037078, mailed Feb. 11, 2011.
Hifax X 1956A, Advanced Plyolefin, Product Information Sheet.
Copending U.S. Appl. No. 12/867,867, filed Aug. 16, 2010 and published as US2011/0001265A1 on Jan. 6, 2011.
Copending U.S. Appl. No. 12/256,217, filed Oct. 22, 2008, and published as US2009/0105404A1 on Apr. 23, 2009.
Copending U.S. Appl. No. 12/256,301, filed Oct. 22, 2008, and published as US2009/0105397A1 on Apr. 23, 2009.
Copending U.S. Appl. No. 11/622,197, filed Jan. 11, 2008, and published as US2008/0045645A1 on Feb. 21, 2008.

* cited by examiner

POLYMERIC COMPOSITIONS AND FILLED TPO ARTICLES HAVING IMPROVED AESTHETICS

CLAIM OF PRIORITY

The present application claims the benefit of the filing date of PCT Application Serial No. PCT/US2010/22539 (filed Jan. 29, 2010) (Published as WO 2010/088488 and U.S. Provisional Patent Application No. 61/148,549 (filed on Jan. 30, 2009), which are both incorporated herein by reference in their entirety for all purposes.

FIELD OF THE INVENTION

The present invention relates generally to filled thermoplastic polyolefin (hereinafter referred to as "TPO") compositions, and particularly the manufacture of filled TPO compositions having improved aesthetics with reduced compounding operations.

BACKGROUND OF THE INVENTION

The use of filled polypropylene compositions is expanding in the fields of exterior and interior automotive trims, in electrical equipment device housings and covers, as well as for other consumer product applications. The materials are popular, at least in part, because they often provide a pleasant tactile sensation.

Filled polypropylene compositions are commonly prepared by melt compounding a polypropylene, a filler, and optional additional components. This usually involves one or more pre-press compounding operations. Filled polypropylene compositions may also be prepared by a processing approach referred to as "at-press" compounding which includes feeding separate particles of a masterbatch composition containing a high concentration of filler and particles of a polypropylene into a part fabrication equipment (e.g., a molding machine) in which the particles are melted, blended, and then shaped into a part. Descriptions of at-press compounding of filled thermoplastics are disclosed for example in U.S. Patent Application No. 61/036,692, filed on Mar. 14, 2008 (now International Patent Application Publication No. WO 2009/114761, published on Sep. 17, 2009), U.S. Patent Application Publication No. US 2007/0246862 A1 (filed on Apr. 17, 2007), and US 2008/0058455 A1 (filed Jun. 25, 2007), all of which are incorporated by reference herein.

Articles molded from filled polypropylene compositions are prone to exhibit surface imperfections, such as flow marks and silver streaks.

Flow marks may manifest on the surface of injected molded articles as a series of alternating high and low gloss bands or stripes, sometimes giving rise to the term "tiger striping". The general trend of each band is approximately perpendicular to the direction of melt flow during injection. These marks do not perceivably affect mechanical properties of the molded article, nor are they discernible by touch. However, their presence is aesthetically unacceptable and often results in unacceptably high quality control reject rate because of the appearance of inhomogeneity within molded parts. The effect is pronounced in large molded articles with a high aspect ratio, such as automobile parts, for example, instrument panels and bumper fascia.

The art has attempted to improve surface appearance properties in molded articles by decreasing the viscosity of the propylene polymer resin. This technique decreased the appearance of the flow marks, however the decrease in viscosity may detrimentally effect other physical properties such as impact strength. Flow marks may also be decreased by annealing the article after the molding process. This annealing step however requires increased dependence on energy to anneal the article, as well as additional time to anneal, and possible equipment modification necessary to allow injection-molding apparati to also serve as annealing mediums. The art has also described adding low viscosity rubber components to polypropylene to improve the appearance of the resultant injection-molded articles, see for example U.S. Pat. No. 5,468,808. Expensive additives, such as fluoropolymers have also been used to improve the appearance of filled TPO compositions as described in PCT Patent Application Publication No. WO2007/024541A2, published Mar. 1, 2007, incorporated by reference herein.

Notwithstanding many successful efforts to date, there exists an ongoing need to provide additional processing techniques to help reduce the flow marks in articles produced from propylene polymer compositions without compromising other physical properties, such as, impact strength.

There also continues to be a need for additional filled TPO compositions that can be used in applications requiring molded parts having good appearance (e.g., automotive interior). For example, there continues to be a need for compositions which result in parts which are free of or have reduced tiger-striping; which exhibit an advantageous balance of high ductility, high impact strength, and/or low stiffness; which exhibit good appearance (e.g., when molded with a molded-in-color); and which are free of, or substantially free of a fluoropolymer).

SUMMARY OF THE INVENTION

The present invention in its various aspects meets some or all of the foregoing needs by providing an improved TPO composition and at-press processing. One aspect of the invention is directed at a polymeric composition comprising about 5 weight percent or more inorganic filler based on the total weight of the polymeric composition; a high viscosity polypropylene impact copolymer having i) a relatively highly crystalline portion wherein the highly crystalline portion is present from about 20 weight percent to about 90 weight percent of the high viscosity polypropylene impact copolymer, and ii) a xylene soluble portion, wherein the xylene soluble portion is present from about 10 weight percent to about 80 weight percent of the high viscosity polypropylene impact copolymer and has a z-average molecular weight of about 1,500,000 Da or more, a number average molecular weight of about 100,000 Da or less, and a polydispersity index of about 5 or more (preferably about 7 or more, and more preferably about 9 or more); and a relatively low viscosity substantially linear ethylene polymer (LV-SLEP) having a polydispersity index of about 3.5 or less, and a melt flow rate of about 40 or more g/10 min as measured according to ASTM D-1238 at 190° C./2.16 kg.

Another aspect of the invention is directed at a polymeric masterbatch (e.g., a polymeric concentrate) comprising about 35 weight percent or more inorganic filler based on the total weight of the polymeric composition; a high viscosity polypropylene impact copolymer having i) a relatively highly crystalline portion, wherein the highly crystalline portion is present from about 20 weight percent to about 90 weight percent of the high viscosity polypropylene impact copolymer, and ii) a xylene soluble portion, wherein the xylene soluble portion is present from about 10 weight percent to about 80 weight percent of the high viscosity polypropylene impact copolymer and has a z-average molecular weight of about 1,500,000 Da or more, a number average molecular weight of about 100,000 Da or less, and a polydispersity index of about 5 or more (preferably about 7 or more, and more preferably about 9 or more); and a relatively low viscosity substantially linear ethylene polymer (LV-SLEP) having a polydispersity index of about 3.5 or less, and a melt flow rate of about 40 g/10 min or more as measured according to ASTM D-1238 at 190° C./2.16 kg; wherein the polymeric masterbatch is suitable for at-press blending with a polyolefin diluent to achieve a molded surface having low surface imperfections.

A further aspect of the invention is directed at a process for manufacturing a molded article including at least one part having a masterbatch containing polymeric composition comprising the steps of: melt blending about 10 weight percent or more of a polymeric masterbatch described herein, and about 40 weight percent or more of a diluent polypropylene having a melt flow rate of about 2.5 or more g/10 min as measured according to ASTM D-1238 at 230° C./2.16 kg to form a molten blend of the masterbatch containing polymeric composition; and molding the masterbatch containing polymeric composition.

In another aspect of the invention the polymeric composition is a filled thermoplastic polyolefin composition (i.e., a filled TPO composition) for use in automotive interior molding applications comprising from about 5 weight percent to about 30 weight percent inorganic filler based on the total weight of the polymeric composition; a high viscosity polypropylene impact copolymer having i) a highly crystalline portion, wherein the highly crystalline portion is present from about 20 weight percent to about 90 weight percent of the high viscosity polypropylene impact copolymer, and ii) a xylene soluble portion, wherein the xylene soluble portion is present from about 10 weight percent to about 80 weight percent of the high viscosity polypropylene impact copolymer and has a z-average molecular weight of about 1,500,000 Da or more, a number average molecular weight of about 100,000 Da or less, and a polydispersity index of about 5 or more (preferably about 7 or more, and more preferably about 9 or more); a low viscosity substantially linear ethylene polymer (LV-SLEP) having a polydispersity index of 3.5 or less, and a melt flow rate of about 40 or more g/10 min as measured according to ASTM D-1238 at 190° C./2.16 kg; and a low viscosity polypropylene having a melt flow rate of about 4 or more g/10 min (preferably from about 5 to about 100 g/10 min) as measured according to ASTM D-1238 at 230° C. and a melting temperature of about 130° C. or more. Preferably the low viscosity polypropylene is selected from one or more of a polypropylene homopolymer, an impact polypropylene copolymer, a polypropylene random copolymer having an ethylene concentration of about 7 weight percent or less, or any combination thereof.

DETAILED DESCRIPTION OF THE INVENTION

Figure 1:
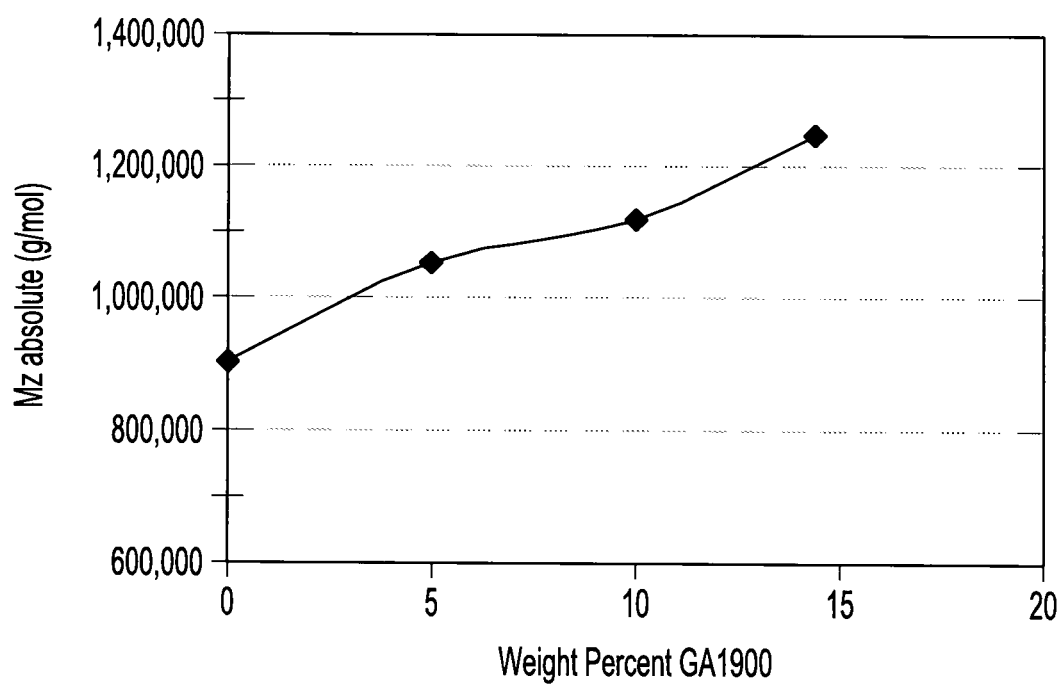
FIG. 1 illustrates the relationship between the concentration of the high viscosity polypropylene impact copolymer and the z-average molecular weight of the xylene soluble fraction of the masterbatch.

The present invention is predicated upon polymeric compositions including a) 5 weight percent or more mineral filler based on the total weight of the polymeric composition, b) a high viscosity polypropylene impact copolymer having: i) a highly crystalline portion present from about 20 weight percent to about 90 weight percent of the polypropylene impact copolymer, and ii) a xylene soluble portion, wherein the xylene soluble portion is present from about 10 weight percent to about 80 weight percent of the high viscosity polypropylene impact copolymer and has a z-average molecular weight of about 1,500,000 Da or more; and c) a low viscosity substantially linear ethylene polymer (LV-SLEP) having a polydispersity index of about 3.5 or less, and a melt flow rate of about 40 or more g/10 min as measured according to ASTM D-1238 at 190° C./2.16 kg, which exhibit surprisingly improved aesthetics and a desirable balance of stiffness, impact strength, and moldability; and which optionally lend themselves well to, or may be used as a masterbatch (e.g., a concentrate) for manufacturing, a TPO composition having such surprising characteristics. Preferably, the xylene soluble portion of the high viscosity polypropylene impact copolymer has a number average molecular weight of about 100,000 Da or less, and a polydispersity index of about 7 or more (more preferably about 9 or more).

As one example, the polymeric composition may be a filled TPO composition in which the inorganic filler concentration ranges from about 5 to about 30 weight percent based on the total weigh of the TPO composition; and the TPO composition further includes a low viscosity polypropylene having a melt flow rate of about 4 or more g/10 min (e.g., from about 5 to about 100 g/10 min) as measured according to ASTM D-1238 at 230° C. and a melting temperature of about 130° C. or more, where the TPO composition has improved aesthetics and a desirable balance of stiffness, impact strength, and moldability. Preferably the low viscosity polypropylene is selected from one or more of a polypropylene homopolymer, an impact polypropylene copolymer, a polypropylene random copolymer having an ethylene concentration of about 7 weight percent or less, or any combination thereof.

As another example, the polymeric composition may be a polymeric masterbatch (e.g., concentrate) in which the mineral filler concentration is at least 30 weight percent. Preferably the polymeric masterbatch includes from about 30 to about 75 weight percent filler). The polymeric masterbatch may have novel characteristics which allows the polymeric masterbatch to be used in preparing filled TPO compositions which surprisingly have improved aesthetics and a desirable balance of stiffness, impact strength, and moldability. Unexpectedly, the polymeric masterbatch may even be mixed with one or more additional polymeric materials in a polymer part forming process (e.g., a molding process), which includes use of an apparatus that includes a screw and barrel assembly, without a step of melt compounding the polymeric masterbatch with at least one of the additional polymeric materials prior to introducing the materials into the screw and barrel assembly. Preferably the one or more additional polymeric materials is one or more of polyolefins such as polypropylene, polyethylene, and the like. For example, the masterbatch and one or more additional polymeric materials may enter a screw and barrel assembly as separate particles (e.g., pellets) and may become melt blended while advancing in the screw and barrel assembly. It will be appreciated that the screw and barrel assembly may provide a shear strain, heat, or preferably both to the masterbatch and the one or more additional polymeric materials.

Filled TPO Composition

The filled TPO composition includes one or more mineral fillers. The filled TPO composition should include a sufficient concentration of mineral filler so that the TPO composition has a generally low coefficient of linear thermal expansion, a generally low shrinkage, or both. Preferred filled TPO compositions may have a concentration of mineral filler (e.g., particulated mineral filler) of about 3 weight percent or more, preferably 5 weight percent or more, more preferably about 7 weight percent or more, and most preferably about 9 weight percent or more based on the total weigh of the TPO composition. The filler concentration should be sufficiently low so that the TPO composition has generally low viscosity so that it can be extruded, molded, or both. The filler concentration may be about 40 weight percent or less, preferably about 30 weight percent or less, more preferably about 24 weight percent or less, and most preferably about 18 weight percent or less based on the total weight of the TPO composition.

The filled TPO composition preferably includes a sufficient amount of high viscosity polypropylene impact copolymer so that the articles made from the filled TPO composition have a generally good aesthetic appearance. The concentration of the high viscosity polypropylene impact copolymer in the filled TPO composition may be such that the filled TPO composition can be easily molded. The concentration of the high viscosity polypropylene impact copolymer in the filled TPO composition is preferably about 15 weight percent or less, more preferably about 10 weight percent or less, even more preferably about 8 weight percent or less and most preferably about 6 weight percent or less. The concentration of the high viscosity polypropylene impact copolymer preferably is about 0.5 weight percent or more, more preferably about 1 weight percent or more, even more preferably about 2 weight percent or more and most preferably about 3 weight percent or more.

The filled TPO composition advantageously may further comprise an impact modifier. Any impact modifier known to those of ordinary skill in the art may be used. Preferred impact modifiers are impact modifiers that are capable of improving the impact toughness of isotactic polypropylene homopolymer. Without limitation, exemplary impact modifiers include linear or substantially linear ethylene polymers (hereinafter referred to as "SLEP"), polypropylene elastomers, olefinic block copolymers, or any combination thereof. The filled TPO composition should have a sufficient amount of impact modifier so that the filed TPO composition is generally tough. The concentration of the impact modifier, the SLEP or both preferably is about 0.5 weight percent or more, more preferably about 1.0 weight percent or more, even more preferably about 1.5 weight percent or more, even more preferably about 2 weight percent or more, and most preferably about 2.5 weight percent or more, based on the total weight of the filled TPO composition. The filled TPO composition should have a concentration of impact modifer sufficiently low so that the impact modifier is either a discrete phase or a co-continuous phase, and preferably a discrete phase. The concentration of the impact modifier, the SLEP or both preferably is about 15 weight percent or less, more preferably about 9 weight percent or less, even more preferably about 7 weight percent or less, and most preferably about 5 weight percent or less based on the total weight of the filled TPO composition. For example, the impact modifier, the SLEP, or both may be present at a concentration from about 0.5 weight percent to about 15 weight percent or even from about 0.5 weight percent to about 5 weight percent.

The filled TPO composition typically will include one or more low viscosity thermoplastic polymers having (under identical test conditions) a viscosity lower than the viscosity of the relatively high viscosity polypropylene impact copolymer. The one or more low viscosity thermoplastic polymers may be polymers that are capable of being extruded, injection molded, or both. Preferably the one or more low viscosity thermoplastic polymers is selected from one or more polypropylene polymers. The one or more low viscosity polypropylene polymers should be present at a sufficient concentration so that polypropylene (e.g., isotactic polypropylene) is a continuous or co-continuous phase in the composition. The total concentration of the one or more low viscosity polypropylene polymers preferably is about 25 weight percent or more, more preferably about 40 weight percent or more, even more preferably about 50 weight percent or more, even more preferably about 60 weight percent or more, and most preferably about 65 weight percent or more, based on the total weight of the filled TPO composition. The total concentration of the one or more low viscosity polypropylene polymers preferably is about 85 weight percent or less, more preferably about 80 weight percent or less, even more preferably about 75 weight percent or less even more preferably about 72 weight percent or less, and most preferably about 70 weight percent or less) based on the total weight of the filled TPO composition. Without limitation, the one or more low viscosity polypropylene polymers may be present at a total concentration from about 40 weight percent to about 80 weight percent or even from about 50 weight percent to about 75 weight percent.

The filled TPO composition may optionally include one or more additives that can include, without limitation, a coupling agent, a flame retardant, an ignition resistant additive, a stabilizer, a colorant, an antioxidant, a mold release agent, an anti-static agent, a slip-aid (i.e., slip resistance aid), a flow enhancer, a nucleating agent, a clarifying agent, or combinations thereof or others.

Polymeric Masterbatch

One aspect of the invention is a polymeric masterbatch which includes a high concentration of a mineral filler. The high concentration of mineral filler in the polymeric masterbatch may allow for the efficient incorporation of filler into a filled TPO corn position.

The polymeric masterbatch should contain a sufficient amount of mineral filler so that a small amount of masterbatch needs to be used in the filled TPO composition. The concentration of mineral filler in the polymeric masterbatch preferably is about 30 weight percent or more, more preferably about 35 weight percent or more, even more preferably about 50 weight percent or more, and most preferably greater than about 60 weight percent or more, based on the total weight of the polymeric masterbatch. The upper limit on the amount of mineral filler is the largest concentration of filler at which the masterbatch can be easily extruded, pelletized, or both. The concentration of mineral filler in the polymeric masterbatch preferably is about 85 weight percent or less, more preferably about 80 weight percent or less, even more preferably about 75 weight percent or less, even more preferably about 70 weight percent or less, and most preferably about 65 weight percent or less, based on the total weight of the polymeric masterbatch. For example the polymeric masterbatch may contain from about 30 weight percent to about 75 weight percent mineral filler, or from about 60 weight percent to about 70 weight percent mineral filler, based on the total weight of the polymeric masterbatch.

The polymeric masterbatch further comprises a high viscosity polypropylene impact copolymer. The high viscosity polypropylene impact copolymer may be any polypropylene impact copolymer that is capable of improving the aesthetics (e.g., reducing the tiger striping) of an injection molded part made from a filled TPO composition that includes the polymeric masterbatch. The high viscosity polypropylene impact copolymer preferably is present in a sufficient amount such that when the masterbatch is used in a filled TPO composition that is injection molded, the injection molded parts have improved aesthetics compared to an identical molded part made with an identical filled TPO composition except the high viscosity polypropylene impact copolymer is replaced by the other polymers (e.g., the impact modifiers) of the polymeric masterbatch. The concentration of the high viscosity polypropylene impact copolymer in the polymeric masterbatch preferably is about 60 weight percent or less, more preferably about 45 weight percent or less, even more preferably about 35 weight percent or less and most preferably about 30 weight percent or less based on the total weight of the polymeric masterbatch. The concentration of the high viscosity polypropylene impact copolymer preferably is about 10 weight percent or more, more preferably about 15 weight percent or more, even more preferably about 18 weight percent or more and most preferably about 20 weight percent or more based on the total weight of the polymeric masterbatch.

The polymeric masterbatch advantageously may further comprise an impact modifier. Any impact modifier which is capable of improving the impact strength of isotactic polypropylene may be used. Preferred impact modifiers include SLEPs, polypropylene elastomers, olefinic block copolymers, or any combination thereof. The concentration of the impact modifier (e.g., the SLEP) is sufficient so that it increases the impact strength of the TPO composition. The concentration of the impact modifier preferably is about 3 weight percent or more, more preferably about 5 weight percent or more, even more preferably about 7 weight percent or more, and most preferably about 10 weight percent or more based on the total weight of the polymeric masterbatch. The concentration of the impact modifier (e.g., the SLEP) preferably is about 50 weight percent or less, more preferably about 35 weight percent or less, even more preferably about 30 weight percent or less, and most preferably about 25 weight percent or less based on the total weight of the polymeric masterbatch. For example, the impact modifier, the SLEP, or both may be present at a concentration from about 5 weight percent to about 50 weight percent, from about 5 weight percent to about 20 weight percent or even from about 10 weight percent to about 20 weight percent based on the total weight of the polymeric masterbatch.

The weight ratio of the impact modifier (e.g., the SLEP) to the high viscosity polypropylene impact polymer in the polymeric masterbatch is chosen such that the impact modifier is either a discrete phase or a co-continuous phase. The weight ratio of the impact modifier (e.g., the SLEP) to the high viscosity polypropylene impact polymer in the polymeric masterbatch preferably is about 10:90 or more, more preferably about 10:50 or more, even more preferably about 10:30 or more, and most preferably about 10:20 or more. The weight ratio of the impact modifier (e.g., the SLEP) to the high viscosity polypropylene impact polymer in the polymeric masterbatch preferably is about 10:5 or less, more preferably about 10:8 or less, even more preferably about 10:10 or less, and most preferably about 10:12 or less. For example the weight ratio of the impact modifier (e.g., the SLEP) to the high viscosity polypropylene impact polymer in the polymeric masterbatch may be from about 10:90 to about 10:5.

The polymeric masterbatch preferably is substantially free of, or even totally free of the one or more relatively low viscosity polypropylene polymers. If employed in the polymeric masterbatch, the total concentration of the one or more low viscosity polypropylene polymers is preferably about 50 weight percent or less, more preferably about 30 weight percent or less, even more preferably about 20 weight percent or less, even more preferably about 5 weight percent or less, even more preferably about 1 weight percent or less, and most preferably about 0.2 weight percent or less, based on the total weight of the polymers in the polymeric masterbatch. The total weight of the polymers in the polymeric masterbatch is the weight of the polymeric masterbatch less the weight of the filler and any other non-polymer constituents. Similarly, if employed in the polymeric masterbatch, the total concentration of the one or more low viscosity polypropylene polymers preferably is about 20 weight percent or less, more preferably about 10 weight percent or less, even more preferably about 5 weight percent or less, even more preferably about 2 weight percent or less, even more preferably about 0.5 weight percent or less and most preferably about 0.1 weight percent or less, based on the total weight of polymeric masterbatch.

The masterbatch may be prepared by any convenient melt compounding process. Preferred compounding process include process that employ one or any combination of a twin screw extruder, a kneader, a single screw extruder having dispersive and/or distributive mixing capabilities, an internal mixer such as a Banbury mixer, and the like. Advantageously, the melt compounding process and the impact modifier are selected to minimize the degredation of the high molecular weight xylene soluble portion of the high viscosity polypropylene impact copolymer. For example, the xylene soluble portion of the masterbatch may have a z-average molecular weight (as expressed in units of 100% polyethylene) of about 700,000 Da or more, preferably about 900,000 Da or more, more preferably about 1,000,000 Da or more, even more preferably about 1,100,000 or more, Da, and most preferably about 1,200,000 Da or more). The z-average molecular weigh may be measured by gel permeation chromatography as described hereinafter.

The masterbatch is preferably extruded or otherwise formed into granules or pellets, preferably having a largest dimension of about 50 or less mm, more preferably about 25 or less mm, and most preferably about 10 or less mm.

High Viscosity Polypropylene Impact Copolymer (HVPIC)

The high viscosity polypropylene impact copolymer includes a highly crystalline portion and a xylene soluble portion and preferably includes: i) a highly crystalline portion that is present from about 20 weight percent to about 90 weight percent of the polypropylene impact copolymer, and ii) a xylene soluble portion that is present from about 10 weight percent to about 80 weight percent based on the total weight of the impact copolymer. The concentration of the xylene soluble portion preferably is about 10 weight percent or more, more preferably 15 weight percent or more, even more preferably about 20 weight percent or more, and most preferably about 22 weight percent or more based on the total weight of the high viscosity polypropylene impact copolymer. The concentration of the xylene soluble portion preferably is about 80 weight percent or less, more preferably about 60 weight percent or less, and more preferably about 55 weight percent or less based on the total weight of the high viscosity polypropylene impact copolymer. The total weight of the highly crystalline portion and the xylene soluble portion preferably is about 50 weight percent or more, more preferably about 75 weight percent or more, even more preferably about 90 weight percent or more, even more preferably about 95 weight percent or more, even more preferably about 98 weight percent or more, and most preferably about 99 weight percent or more, based on the total weigh of the high viscosity polypropylene impact copolymer. A particularly preferred high viscosity polypropylene impact copolymer consists of i) a polymer component that includes, or consists of the highly crystalline portion and the xylene soluble portion and optionally ii) a non-polymer component that includes one or more additives. The concentration of the non polymeric additives, if present, preferably is about 17 weight percent or less, more preferably about 6 weight percent or less and most preferably about 3 weight percent or less, based on the total weight of the high viscosity polypropylene impact copolymer.

The highly crystalline portion preferably includes, consists essentially of, or consists substantially entirely of isotactic polypropylene. The amount of isotactic polypropylene in the highly crystalline portion preferably is preferably about 80 weight percent or more, more preferably about 95 weight percent or more, and most preferably about 99 weight percent or more based on the total weight of the highly crystalline portion. Preferred isotactic polypropylenes include isotactic polypropylene containing 94 weight percent or more propylene units, based on the total weight of the isotactic polypropylene, the total weight of the highly crystalline portion, or both. For example, the isotactic polypropylene may be a polypropylene homopolymer or a polypropylene copolymers having 98 weight percent or more, preferably 99 weight percent or more propylene units based on the total weight of the highly crystalline portion. The highly crystalline portion may be characterized by a crystallinity of about 30 weight percent or more, preferably about 40 weight percent or more, more preferably about 50 weight percent or more, and most preferably about 60 weight percent or more based on the total weight of the highly crystalline portion, as measured for example by differential scanning calorimetry as described later in the section titled "Test Methods".

The highly crystalline portion is preferably insoluble in xylene. For example, when placed in hot xylene the highly crystalline portion either does not dissolve in the hot xylene or precipitates upon cooling the hot xylene to about 20° C.

The high viscosity polypropylene impact copolymer also includes a xylene soluble portion. The xylene soluble portion is soluble in xylene (e.g., at a concentration of about 1 weight percent polymer and 99 weight percent xylene) at about 20° C. The xylene soluble portion is preferably a polyolefin and may be a copolymer including ethylene, propylene or both. Exemplary copolymers for use in the xylene soluble portion include ethylene copolymers (preferably containing from about 20 to about 80 mole % ethylene), propylene copolymers (preferably containing from about 20 to about 80 mole % propylene), or any combination thereof. One particularly preferred copolymer suitable for use in the xylene soluble portion is a copolymer including at least 20 mole % ethylene and at least 20 mole % propylene, wherein the total concentration of ethylene and propylene is about 80 weight percent or more, preferably about 95 weight percent or more, and more preferably about 99 weight percent or more based on the total weight of the copolymer.

The xylene soluble portion preferably has a crystallinity less than the crystallinity of the highly crystalline portion. Preferably the xylene soluble portion has a crystallinity of about 25 percent or less, more preferably about 15 percent or less, and most preferably about 10 percent or less as measured by differential scanning calorimetry. One particularly preferred xylene soluble portion is amorphous at room temperature.

The xylene soluble portion preferably has a relatively high z-average molecular weight, a relatively broad molecular weight distribution (e.g., a relatively high polydispersity index), or both. The z-average molecular weight of the xylene soluble portion preferably is about 1,500,000 Da or more, more preferably about 1,800,000 Da or more, even more preferably about 2,000,000 Da or more, and most preferably about 2,400,000 Da or more. The z-average molecular weight of the xylene soluble portion preferably is about 8,000,000 Da or less, preferably about 5,000,000 Da or less, more preferably about 3,500,000 Da or less, and most preferably about 3,200,000 Da or less. The polydispersity index (i.e. the ratio of the weight average molecular weigh and the number average molecular weight) of the xylene soluble portion preferably is preferably about 5 or more, more preferably about 7 or more, even more preferably about 8 or more, and most preferably about 9 or more. Preferably, the xylene soluble portion has a relatively low number average molecular weight. The number average molecular weight of the xylene soluble portion preferably is about 120,000 Da or less, more preferably about 100,000 Da or less, even more preferably about 80,000 Da or less, and most preferably about 60,000 Da or less.

After compounding the high viscosity polypropylene impact copolymer with a filler and one or more polymers, the blend may have a xylene soluble component characterized by a relatively high z-average molecular weight, but may be reduced from the z-average molecular weight of the xylene soluble portion of the high viscosity impact copolymer prior to compounding. The z-average molecular weight of the xylene soluble component after compounding with a filler and one or more polymers preferably is about 1,000,000 Da or more, more preferably about 1,100,000 Da or more, even more preferably about 1,200,000 Da or more, and most preferably about 1,500,000 Da or more.

The high viscosity polypropylene impact copolymer may be characterized by a peak melting temperature of about 140° C. or more, preferably about 150° C. or more, more preferably about 155° C. or more, and most preferably about 160° C. or more, as measured by differential scanning calorimetry as described later in the section titled "Test Methods".

The high viscosity polypropylene impact copolymer generally will have a low melt flow rate, preferably about 3 or less g/10 min, more preferably about 2.5 or less g/10 min, even more preferably about 2 or less g/10 min, and most preferably about 1.5 or less g/10 min. The high viscosity polypropylene impact copolymer has a melt flow rate that is preferably about 0.1 or more g/10 min, more preferably about 0.5 or more g/10 min, even more preferably greater about 0.8 or more g/10 min, and most preferably about 1.0 or more g/10 min. The melt flow rate may be measured according to ISO 1133 at a load of 2.16 kg, as described hereinafter.

The high viscosity polypropylene impact copolymer may be made in-reactor, by one or more compounding steps, or any combination thereof. The high viscosity polypropylene impact copolymer is preferably made in-reactor using a single or preferably a plurality of polymerization steps, and most preferably using a plurality of polymerization steps.

Preferred high viscosity polypropylene impact copolymer have good mechanical properties, including a high elongation at break, a high tensile stress at yield, or both. Preferred high viscosity polypropylene impact copolymers may be characterized by a tensile elongation at break of about 100% or more, preferably about 250% or more, more preferably about 350% or more, and most preferably about 400% or more, as measured according to ISO 527, -1, -2. Preferred high viscosity polypropylene impact copolymer may have a tensile elongation at break of about 2000% or less. Preferred high viscosity polypropylene impact copolymers may be characterized by a tensile stress at yield of about 5 or more MPa, more preferably about 10 or more MPa, even more preferably about 15 or more MPa, and most preferably about 20 or more MPa, as measured according to ISO 527-1, -2. Preferred high viscosity polypropylene impact copolymers may be characterized by a tensile stress at yield of about 35 or less MPa, more preferably about 30 or less MPa, even more preferably about 27 or less MPa, and most preferably about 25 or less MPa, as measured according to ISO 527, -1, -2. Preferred high viscosity polypropylene impact copolymers may be characterized by a flexural modulus of about 200 or more MPa, preferably about 400 or more MPa, more preferably about 600 or more MPa, and most preferably about 75 or more MPa, as measured according to ISO 178. Preferred high viscosity polypropylene impact copolymers may be characterized by a flexural modulus of about 1500 or less MPa, preferably about 1300 or less MPa, more preferably about 1100 or less MPa, and most preferably about 950 or less MPa, as measured according to ISO 178.

Impact Modifier

The impact modifier which may be used in the filled TPO compositions, the polymeric masterbatch, or both may advantageously include or consist essentially of rubbery materials having a glass transition temperature $T_g$ sufficiently low so that the composition does not easily fracture when deformed at low temperatures. Preferable impact modifiers have a $T_g$ equal to or less than 0° C., more preferably equal to or less than –20° C., even more preferably equal to or less than –40° C., and most preferably equal to or less than –46° C. $T_g$ is the temperature or temperature range at which a polymeric material shows an abrupt change in its physical properties, including, for example, mechanical strength. The $T_g$ of the impact modifier may be determined by differential scanning calorimetry.

The impact modifier may be amorphous or semi-crystalline at room temperature (about 20° C.). Preferably, the impact modifier is a semi-crystalline thermoplastic. Preferred impact modifiers may be formed into pellets (e.g., without the use of a surface coating such as a powdered filler or a polymeric coating) which do not stick together at temperatures of 30° C. and below, or even 40° C. and below. Preferable impact modifiers may have a crystallinity of about 5 weight percent or more, preferably about 8 weight percent or more, more preferably about 11 weight percent or more, and most preferably about 13 weight percent or more based on the total weight of the impact modifier. Preferable impact modifiers may have a crystallinity of about 35 weight percent or less, preferably about 30 weight percent or less, more preferably about 25 weight percent or less, and most preferably about 22 weight percent or less based on the total weight of the impact modifier. Crystallinity of the impact modifier may be measured by differential scanning calorimetry.

The impact modifier preferably has a low viscosity, which may be characterized by a high melt flow rate. For example, the impact modifier may have a melt flow rate of about 35 or more g/10 min, preferably about 50 or more g/10 min, more preferably about 100 or more g/10 min, even more preferably about 300 or more g/10 min, and most preferably about 450 or more g/10 min. Measurement of high melt flow rates poses practical challenges and the may require extrapolations and or approximations. The impact modifier preferably has a Brookfield viscosity of about 150,000 cps or less, more preferably about 80,000 cps or less, more preferably about 40,000 cps or less, and most preferably about 25,000 cps or less as measured at about 177° C. Without limitation, exemplary impact modifiers may have a Brookfield Viscosity from about 6,000 to about 10,000 cps (e.g., about 8,200 cps) or from about 14,000 to about 20,000 cps (e.g., about 17,000 cps).

In one aspect of the invention, the impact modifier may have a melting temperature of about 90° C. or less, preferably about 80° C. or less. Such an impact modifier may be available as pellets which may stick together when heated to an elevated temperature. For example, pellets of the impact modifier may stick together when heated to a temperature of about 60° C. or more, about 70° C. or more, about 80° C. or more, or even about 90° C. or more), such as when attempting to dry the impact modifier in an oven. Advantageously, the characteristics (e.g., the crystallinity and/or the melting temperature) and the concentration of the high viscosity polypropylene impact copolymer are such that the pellets of the polymeric masterbatch do not stick together at one or all of the aforementioned drying temperatures (e.g., after drying for about 2, about 4, about 8 or even about 24 hours).

Substantially Linear or Linear Ethylene Polymers (SLEPs)

The ingredients herein (e.g., the impact modifier) may include, consist essentially of, or even consist of one or more alpha-olefin elastomers, such as one or more linear ethylene copolymers (also known as "LEPs"), one or more substantially linear ethylene copolymers (also known as "SLEPs"), or both. As used herein, SLEPs typically include LEPs and means a copolymer of ethylene and one or more alpha-olefin comonomers having a linear backbone, a specific and limited amount of long-chain branching or no long-chain branching, a narrow molecular weight distribution, a narrow composition distribution (e.g., for alpha-olefin copolymers) or a combination thereof. Substantially linear ethylene copolymers and linear ethylene copolymers and their method of preparation are fully described in U.S. Pat. Nos. 5,272,236; and 5,278,272, which are fully incorporated herein by reference for all purposes.

Short-chain branches in a linear copolymer arise from the pendent alkyl group resulting upon polymerization of intentionally added $C_3$ to $C_{20}$ α-olefin comonomers. Narrow composition distribution is also sometimes referred to as homogeneous short-chain branching. Narrow composition distribution and homogeneous short-chain branching refer to the fact that the alpha-olefin comonomer is randomly distributed within a given copolymer of ethylene and an alpha-olefin comonomer and virtually all of the copolymer molecules have the same ethylene to comonomer ratio. The narrowness of the composition distribution is indicated by the value of the Composition Distribution Branch Index (CDBI) or sometimes referred to as Short Chain Branch Distribution Index. CDBI is defined as the weight percent of the polymer molecules having a comonomer content within 50 percent of the median molar comonomer content. The CDBI is readily calculated, for example, by employing temperature rising elution fractionation, as described in Wild, Journal of Polymer Science, Polymer Physics Edition, Volume 20, page 441 (1982), or U.S. Pat. No. 4,798,081. The CDBI for the SLEPs in the present invention is greater than about 30 percent, preferably greater than about 50 percent, and more preferably greater than about 90 percent.

Long-chain branches in SLEPs are polymer branches other than short chain branches. Typically, long chain branches are formed by insitu generation of an oligomeric α-olefin via β-hydride elimination in a growing polymer chain. The resulting species is a relatively high molecular weight vinyl terminated hydrocarbon which upon polymerization yields a large pendent alkyl group. Long-chain branching may be further defined as hydrocarbon branches to a polymer backbone having a chain length greater than n minus 2 ("n–2") carbons, where n is the number of carbons of the largest alpha-olefin comonomer intentionally added to the reactor. Preferred long-chain branches in homopolymers of ethylene or copolymers of ethylene and one or more $C_3$ to $C_{20}$ α-olefin comonomers have at least from 20 carbons up to more preferably the number of carbons in the polymer backbone from which the branch is pendant. Long-chain branching may be distinguished using $^{13}C$ nuclear magnetic resonance spectroscopy alone, or with gel permeation chromatography-laser light scattering (GPC-LALLS) or a similar analytical technique. Substantially linear ethylene polymers preferably contain at least 0.01 long-chain branches/1000 carbons and more preferably 0.05 or more long-chain branches/1000 carbons. In general, substantially linear ethylene polymers preferably contain less than or equal to 3 long-chain branches/1000 carbons and more preferably less than or equal to 1 long-chain branch/1000 carbons.

A general description of suitable SLEPs, or what have been referred to as substantially linear olefin polymers in U.S. Pat. No. 5,278,272, are described in column 2, lines 31-64, and from col. 3, line 4 to col. 5, line 55, both sections incorporated by reference herein, and in U.S. Pat. No. 5,272,236 column 2, lines 22-51, incorporated by reference herein. Methods for characterizing these SLEPs are described in U.S. Pat. No. 5,278,272 (see for example column 5, line 57 to column 7, line 15, incorporated by reference herein.

Preferable SLEPs may be made, for example using a constrained geometry catalyst or a metallocene catalyst. The catalyst may be a supported catalyst. Any of the catalysts disclosed in U.S. Pat. No. 5,278,272, column 7, line 16 to column 14, line 48 and any of the polymerization process described in U.S. Pat. No. 5,282,272 column 14, line 50 to column 16, line 19 (both sections incorporated by reference herein) may be used to prepare suitable SLEPs. Other catalysts which may be used include those described in EP Patent Application Publication No. 0260999A1, page 3 line 29 to page 5, line 48, (filed Sep. 21, 1987), EP Patent Application Publication No. 0129368A1, page 5, line 4 to page 8, line 29 (filed Jun. 5, 1987), U.S. Pat. No. 5,055,438 column 4, line 18 to column 10, line 28, U.S. Pat. No. 4,935,397 column 2, line 35 to column 8, line 3, U.S. Pat. No. 4,937,301 column 3, lines 20-47, and U.S. Pat. No. 4,701,432 column 2, line 2 to column 4, line 17 and column 5, line 61 to column 8, line 18, all sections incorporated by reference herein. Preferred SLEPs are prepared by using metallocene based catalysts capable of readily polymerizing high molecular weight alpha-olefin copolymers under the process conditions. The SLEPs may be prepared using metallocene or vanadium based catalyst under conditions that do not permit polymerization of monomers other than those intentionally added to the reactor. The SLEPs thus prepared, may be characterized by a low residuals content (i.e. a low concentration therein of the catalyst used to prepare the polymer, unreacted comonomers and low molecular weight oligomers made during the course of the polymerization), a controlled molecular architecture which provides good processability even though the molecular weight distribution is narrow relative to conventional olefin polymers, or any combination thereof.

As used herein with respect to SLEPs, copolymer means a polymer of two or more intentionally added comonomers, for example, such as might be prepared by polymerizing ethylene with at least one other $C_3$ to $C_{20}$ comonomer (e.g., α-olefin comonomer). Illustrative α-olefins comonomers for suitable SLEPs include propylene, 1-butene, 1-hexene, 4-methyl-1-pentene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, ethylene-octene, vinylcyclopentene, vinylcyclohexene and vinylnorbornene, where alkyl branching position is not specified it is generally on position 3 or higher of the alkene and styrene. The α-olefin is desirably a $C_3$-$C_{20}$ α-olefin, or combinations thereof, and more desirably a $C_3$-$C_{10}$ α-olefin, or combinations thereof. Preferred α-olefins include monounsaturated α-olefins such as propylene, 1-butene, 1-hexene, 1-octene, and any combination thereof (e.g., combinations of 1-butene, 1-hexene, and 1-octene). Preferred copolymers include ethylene-propylene (EP), ethylene-butene (EB), ethylene-1-hexene (EH), and ethylene-1-octene (EO) polymers. The SLEPs may have two, three (e.g., a terpolymer) or more monomers. Illustrative terpolymers include an ethylene/propylene/octene terpolymer as well as terpolymers of ethylene, a $C_3$-$C_{20}$ alpha-olefin and a diene such as dicyclopentadiene, 1,4-hexadiene, piperylene or 5-ethylidene-2-norbornene. Typical SLEPs may be substantially free of diene monomers (e.g., a concentration of less than 5 weight percent diene monomer, preferably less than 1 weight percent, more preferably less than 0.1 weight percent and most preferably less than 0.05 weight percent, based on the total weight of the SLEPs) or even totally free of diene monomers (i.e., monomers having two or more double bonds).

The SLEP may include one or more higher α-olefin containing at least 3, preferably at least 4, more preferably at least 6, and most preferably at least 8 carbon atoms. For example, suitable higher alpha-olefins may include one or more α-olefins containing from 4 to about 20 carbon atoms, more preferably one or more α-olefins containing from about 4 to about 12 carbon atoms, and most preferably one or more α-olefins containing from about 8 to about 12 carbon atoms. The higher α-olefin may include or consist essentially of 1-butene, 1-hexene, or 1-octene. Preferable SLEPs may contain ethylene monomer at a concentration of about 50 weight percent or more ethylene monomer, and more preferably about 55 weight percent or more, based on the total weight of the SLEP. Preferable SLEPs may contain ethylene monomer at a concentration of about 85 weight percent or less, more preferably about 80 weight percent or less, even more preferably about 70 weight percent or less, and most preferably about 65 weight percent or less, based on the total weight of the SLEP. The concentration of the higher alpha-olefin in the SLEP preferably is about 12 weight percent or more, more preferably about 20 weight percent or more, even more preferably about 30 weight percent or more and most preferably about 35 weight percent or more based on the total weight of the SLEP. For example, the SLEP may be a copolymer which contains ethylene monomer at a concentration of about 50 weight percent or more and 1-octene monomer at a concentration of about 12 weight percent or more (e.g. about 30 weight percent or more) based on the total weight of the SLEP. Preferable SLEPs may be characterized by a molar concentration of ethylene of about 65 percent or more, more preferably about 70 percent or more, even more preferably about 75 percent or more, even more preferably about 80 percent or more, and most preferably about 85 percent or more. Such SLEP may be further characterized by a molar concentration of the higher α-olefin of about 5 percent or more, preferably about 8 percent or more, more preferably about 10 percent or more, even more preferably about 12 percent or more, and most preferably about 15 percent or more. The comonomer content in the SLEPs is generally calculated based on the amount of monomers consumed during the polymerization reaction. Alternatively, the comonomer content may be measured using infrared spectroscopy according to ASTM D-2238, Method B. Suitable SLEPs are commercially available from THE DOW CHEMICAL COMPANY under the designation of ENGAGE® and from EXXONMOBIL CHEMICAL COMPANY under the designation of EXACT®.

Preferred SLEPs may have a density of about 0.855 or more g/cm³, preferably about 0.860 or more g/cm³, more preferably about 0.865 or more g/cm³, and most preferably about 0.867 or more g/cm³. The density of the SLEPs preferably is about 0.908 or less g/cm³, more preferably about 0.895 or less g/cm³, even more preferably about 0.890 or less g/cm³, and most preferably about 0.880 or less g/cm³. One preferred SLEP for use in the impact modifier is characterized by a density between about 0.860 to about 0.885 g/cm³ (e.g., from about 0.868 to about 0.878 g/cm³) as measured according to ASTM D 792-00.

Preferred SLEPs which may be used as the impact modifier may have a peak melting temperature, as measured for example by differential scanning calorimetry, of about 100° C. or less, preferably about 85° C. or less, more preferably about 80° C. or less, even most preferably about 75° C. or less, and most preferably about 65° C. or less. Preferred SLEP may be characterized by a peak melting temperature of about 35 or more ° C., preferably about 40 or more ° C., more preferably about 45 or more ° C., and most preferably about 50 or more ° C. One preferred SLEP for use in the impact modifier is characterized by a peak melting temperature from about 45° C. to 70° C., and more specifically from about 53° C. to about 62° C.

Preferred SLEPs have a hardness less than the hardness of isotactic polypropylene, greater than the hardness of highly oil extended elastomers (e.g., containing at least 60 wt. % oil). The hardness of the SLEP may be measured as a durometer on a plaque made of the neat SLEP in Shore A units, as descrbied hereinafter. Preferred SLEPs for the impact modifier may exhibit a durometer, in units of Shore A, of about 45 or more, more preferably about 55 or more, even more preferably about 60 or more, and most preferably about 65 or more. The durometer of preferred SLEP, in units of Shore A, may be about 95 or less, more preferably about 90 or less, even more preferably about 85 or less, and most preferably about 80 or less. For example, the SLEP may have a durometer preferably from about 65 to about 95 Shore A, more preferably from about 65 to about 85 Shore A, and most preferably from about 65 to about 80 Shore A. One preferred SLEP is characterized by a durometer from about 68 to about 75 Shore A.

Preferable SLEPs typically have a $T_g$ of about −46° C. or less, and more preferably about −50° C. or less. Preferable SLEPs typically have a $T_g$ of about −60 or more ° C., and more preferably about −55 or more ° C. A particularly preferred SLEP has a $T_g$ from about −47° C. to about −57° C. and more preferably from about −51° C. to about −54° C.

The polydispersity index (Mw/Mn) for SLEPs is the weight average molecular weight (Mw) divided by number average molecular weight (Mn). Mw and Mn are measured by gel permeation chromatography (GPC). For SLEPs, the $I_{10}/I_2$ ratio may indicates the degree of long-chain branching, i.e. the larger the $I_{10}/I_2$ ratio, the more long-chain branching exists in the polymer. In preferred SLEPs Mw/Mn is related to $I_{10}/I_2$ by the equation: $Mw/Mn \leq (I_{10}/I_2) - 4.63$. The Mw/Mn for suitable SLEPs may be at least about 1.5, preferably at least about 2.0 and may be less than or equal to about 3.5, more preferably less than or equal to about 3.0.

Preferred SLEPs may have a melt flow ratio, measured as $I_{10}/I_2$, greater than or equal to about 5.63, more preferably about 6.5 or more, and most preferably about 7 or more. The melt flow ratio of preferred SLEPs may be about 20 or less, more preferably about 15 or less, and most preferably about 10 or less. Without limitation, the melt flow ratio of the SLEP may be about 5.63 or more, from about 6.5 to about 15, or from about 7 to about 10. The melt flow ratio of the SLEPs may be measured at 190° C.

Without limitation, exemplary SLEPs which may be employed in the impact modifier include what are described in U.S. Pat. No. 5,272,236 (e.g., column 2, lines 41-51 and column 3, lines 25-30) as substantially linear olefin polymers having the following characteristics:

a) a melt flow ratio, $I_{10}/I_2$, $\leq 5.63$,
b) a molecular weight distribution, Mw/Mn, defined by the equation:

$$Mw/Mn \leq I_{10}/I_2 - 4.63, \text{ and}$$

c) a critical shear stress at onset of gross melt fracture of greater than about $4 \times 10^6$ dyne/cm².

The critical shear stress at onset of gross melt fracture is measured by gas extrusion rheometer (GER) as described in U.S. Pat. No. 5,272,236 (e.g., column 4, lines 10-45). The gas extrusion rheometer is described by M. Shida, R. N. Shroff and L. V. Cancio in Polymer Engineering Science, Vol. 17, no. 11, p. 770 (1977), and in "Rheometers for Molten Plastics" by John Dealy, published by Van Nostrand Reinhold Co. (1982) on page 97, both publications of which are incorporated by reference herein in their entirety. All GER experiments are performed at a temperature of about 190° C. and a ratio of the length to the diameter of the die of about 20:1. An apparent shear stress vs. apparent shear rate plot is used to identify the melt fracture phenomena. According to Ramamurthy in Journal of Rheology, 30(2), 337-357, 1986, above a certain critical flow rate, the observed extrudate irregularities may be broadly classified into two main types: surface melt fracture and gross melt fracture. Surface melt fracture occurs under apparently steady flow conditions and ranges in detail from loss of specular gloss to the more severe form of "sharkskin". Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER. Preferably, the critical shear stress at the OGMF and the critical shear stress at the OSMF for the substantially linear ethylene polymers described herein is greater than about $4 \times 10^6$ dyne/cm$^2$ and greater than about $2.8 \times 10^6$ dyne/cm$^2$, respectively.

Without limitation, additional SLEPs which may be suitable for the impact modifier may include those described in EP Patent No. 0495099, filed Dec. 12, 1989, incorporated by reference herein. For example, EP Patent No. 0495099 describes SLEPs having (a) structural units derived from ethylene and (b) structural units derived from α-olefin of 3-20 carbon atoms, which are characterized in that they have
  (i) a density of 0.85-0.92 g/cm$^3$,
  (ii) an intrinsic viscosity [η] of 0.1-10 dl/g as measured in decalin at 135° C.,
  (iii) a ($M_w/M_n$) ratio of a weight average molecular weight ($M_w$) to a number average molecular weight ($M_n$) from 1.2 to 4 as measured by GPC, and
  (iv) a melt flow ratio $I_{10}/I_2$ from 8 to 50 as measured at 190° C.

Polypropylene Elastomers

Additional impact modifiers, which may be used alone or in combination with the other impact modifiers described herein, in the filled TPO composition and/or the polymeric masterbatch includes polypropylene elastomers. Any polypropylene elastomer containing about 50 weight percent or more propylene monomer based on the total weight of the polypropylene elastomer may be used. Preferred polypropylene elastomers may contain propylene monomer at a concentration of about 70 weight percent or more, more preferably about 80 weight percent or more, and most preferably about 85 weight percent or more, based on the weight of the polypropylene elastomer. The polypropylene elastomers may also contain one or more additional $C_{2-12}$ α-olefin comonomers. Preferred polypropylene elastomers contain one or more additional $C_{2-12}$ α-olefin comonomers at a concentration of about 5 weight percent or more, more preferably about 7 weight percent or more, even more preferably about 9 weight percent or more, and most preferably about 12 weight percent or more based on the total weight of the polypropylene elastomer. For example, the comonomer content may range from about 5 to about 40 percent by weight of the polypropylene elastomer composition, more preferably from about 7 to about 30 percent by weight of the polypropylene elastomer composition, and most preferably from about 9 to about 15 percent by weight of the polypropylene elastomer composition. The one or more additional $C_{2-12}$ α-olefin comonomers preferably includes ethylene, butane or both, and most preferably consists of ethylene, butane, or both. The polypropylene elastomer may have some crystallinity or may be substantially entirely if not completely amorphous (e.g., at about 25° C.). Preferred polypropylene elastomers may have a peak melting temperature of about 130° C. or less, more preferably about 115° C. or less, and most preferably about 100 or less ° C., as measured by differential scanning calorimetry.

The propylene elastomer preferably contains an α-olefin selected from ethylene, butene, hexene, and octene. More preferably the propylene elastomer contains an α-olefin selected from ethylene, butene, and octene. Most preferably the propylene elastomer contains an α-olefin selected from ethylene and butene.

Preferred polypropylene elastomers may exhibit a Shore A hardness (i.e., durometer) as measured according to ASTM D 2240-05 of about 40 or more, more preferably about 50 or more, and most preferably about 65 or more. Preferred polypropylene elastomers may have a Shore A hardness of about 97 or less, preferably about 95 or less, more preferably about 92 or less, even more preferably about 85 or less, and most preferably about 80 or less. For example, the polypropylene elastomer may have a Shore A hardness from about 40 to about 97, more preferably from about 50 to about 95, and still more preferably from about 65 to about 95 Shore A.

Preferred polypropylene elastomers may have a melt flow rate as measured according to ASTM D1238 at 230° C./2.16 kg of about 1 or more g/10 min, more preferably about 4 or more g/10 min, even more preferably about 7 or more g/10 min, and most preferably about 10 or more g/10 min. Preferred propylene elastomers suitable for the polymeric composition may have a melt flow rate of about 1500 or less g/10 min, more preferably about 150 or less g/10 min, even more preferably about 100 or less g/10 min, and most preferably about 60 or less g/10 min.

It is preferred that the polypropylene elastomer exhibit at least some crystallinity. The crystallinity (in percent by weight of the material) may be about 2 percent or more, more preferably about 5 percent or more, and most preferably about 7 percent or more, by weight of the polypropylene elastomer material. Preferred polypropylene elastomers may have a crystallinity (in percent by weight of the material) of about 50 or less percent, more preferably about 40 percent or less, even more preferably about 35 percent or less, even more preferably about 28 percent or less, even more preferably about 20 percent or less, and most preferably about 14 percent or less, based on the total weight of the polypropylene elastomer material. For example, preferred propylene elastomer may have a crystallinity from about 2 weight percent to about 50 weight percent, more preferably from about 2 weight percent to about 40 weight percent, even more preferably from about 5 weight percent to about 35 weight percent, and most preferably about 7 weight percent to about 20 weight percent, based on the total weight of the polypropylene elastomer material.

Exemplary propylene elastomers which may be used include elastomeric polymers containing greater than about 50 weight percent (e.g., greater than 60 weight percent) propylene monomer and greater than about 5 weight percent ethylene monomer and may be characterized by a peak melting temperature from about 35° C. to about 130° C. (e.g. from about 40° C. to about 110° C.) as measured by differential scanning calorimetry. Such elastomers are commercially available from THE DOW CHEMICAL COMPANY under the designation of VERSIFY® (e.g., including 2400, 3000, 3200, 3300, 3401, and 4301) and from EXXONMOBIL CHEMICAL COMPANY under the designation of VISTAMAXX®.

Additional specific examples of propylene elastomers that may be employed in accordance with the present teachings include those disclosed in WO 03/040201 A1 filed on May 6, 2002, published US Application No. 2003-0204017 filed on May 5, 2002, and U.S. Pat. No. 6,525,157 issued on Feb. 25, 2003, all of which are incorporated in their entirety by reference.

For example, the propylene elastomer may include a Low Elasticity Ethylene-Propylene Copolymer (LEEP Copolymer) as described in U.S. Pat. No. 6,525,157. Suitable LEEP Copolymer may contain from a lower limit of 5% or 6% or 8% or 10% by weight to an upper limit of 20% or 25% by weight ethylene-derived units, and from a lower limit of 75% or 80% by weight to an upper limit of 95% or 94% or 92% or 90% by weight propylene-derived units, the percentages by weight based on the total weight of propylene- and ethylene-derived units. The copolymer is substantially free of diene-derived units.

In various embodiments, features of the LEEP Copolymers include one or any combination (or even all) of the following characteristics, where ranges from any recited upper limit to any recited lower limit are contemplated:

(i) a melting point ranging from an upper limit of less than 110° C., or less than 90° C., or less than 80° C., or less than 70° C., to a lower limit of greater than 25° C., or greater than 35° C., or greater than 40° C., or greater than 45° C.;

(ii) a relationship of elasticity to 500% tensile modulus such that Elasticity $\leq 0.935M+12$, or Elasticity $\leq 0.935M+6$, or Elasticity $\leq 0.935M$, where elasticity is in percent and M is the 500% tensile modulus in mega Pascal (MPa);

(iii) a relationship of flexural modulus to 500% tensile modulus such that Flexural Modulus $\leq 4.2e^{0.27M}+50$, or Flexural Modulus $\leq 4.2e^{0.27M}+30$, or Flexural Modulus $\leq 4.2e^{0.27M}+10$, or Flexural Modulus $\leq 4.2e^{0.27M}+2$, where flexural modulus is in MPa and M is the 500% tensile modulus in MPa;

(iv) a heat of fusion ranging from a lower limit of greater than 1.0 joule per gram (J/g), or greater than 1.5 J/g, or greater than 4.0 J/g, or greater than 6.0 J/g, or greater than 7.0 J/g, to an upper limit of less than 125 J/g, or less than 100 J/g, or less than 75 J/g, or less than 60 J/g, or less than 50 J/g, or less than 40 J/g, or less than 30 J/g;

(v) a triad tacticity as determined by carbon-13 nuclear magnetic resonance ($^{13}C$ NMR) of greater than 75%, or greater than 80%, or greater than 85%, or greater than 90%;

(vi) a tacticity index m/r ranging from a lower limit of 4 or 6 to an upper limit of 8 or 10 or 12;

(vii) a proportion of inversely inserted propylene units based on 2,1 insertion of propylene monomer in all propylene insertions, as measured by $^{13}C$ NMR, of greater than 0.5% or greater than 0.6%;

(viii) a proportion of inversely inserted propylene units based on 1,3 insertion of propylene monomer in all propylene insertions, as measured by $^{13}C$ NMR, of greater than 0.05%, or greater than 0.06%, or greater than 0.07%, or greater than 0.08%, or greater than 0.085%;

(ix) an intermolecular tacticity such that at least X percent by weight of the copolymer is soluble in two adjacent temperature fractions of a thermal fractionation carried out in hexane in 8° C. increments, where X is 75, or 80, or 85, or 90, or 95, or 97, or 99;

(x) a reactivity ratio product $r_1 r_2$ of less than 1.5, or less than 1.3, or less than 1.0, or less than 0.8;

(xi) a molecular weight distribution Mw/Mn ranging from a lower limit of 1.5 or 1.8 to an upper limit of 40 or 20 or 10 or 5 or 3;

(xii) a molecular weight of from 15,000-5,000,000;

(xiii) a solid state proton nuclear magnetic resonance ($^1H$ NMR) relaxation time of less than 18 milliseconds (ms), or less than 16 ms, or less than 14 ms, or less than 12 ms, or less than 10 ms;

(xiv) an elasticity as defined herein of less than 30%, or less than 20%, or less than 10%, or less than 8%, or less than 5%; or (xv) a 500% tensile modulus of greater than 0.5 MPa, or greater than 0.8 MPa, or greater than 1.0 MPa, or greater than 2.0 MPa.

The LEEP Copolymer may be made in the presence of a bridged metallocene catalyst, in a single steady-state reactor.

The test methods for the LEEP Copolymer are described in U.S. Pat. No. 6,525,157, issued Feb. 25, 2003, incorporated by reference herein. The melting point, heat of fusion and crystallinity measurements are described in U.S. Pat. No. 6,525,157, column 5, line 58 to column 6, line 21 and column 19, lines 12-30, incorporated herein by reference. The flexural modulus, tensile modulus, and elasticity measurements are described in U.S. Pat. No. 6,525,157, column 17, line 1 to column 18, line 58. The triad tacticity, the tacticity index, the proportion of inversely inserted propylene units, and the intermolecular and intramolecular compositional distribution measurements are described in U.S. Pat. No. 6,525,157, column 6, line 22 to column 9, line 28, column 10, line s 16-53, and column 19, lines 30-60, incorporated herein by reference. The monomer sequence distribution and reactivity ratio product measurements are described in U.S. Pat. No. 6,525,157, column 11, line 9 to column 12, line 9, incorporated herein by reference. The $^1H$ NMR relaxation time measurements are described in U.S. Pat. No. 6,525,157, column 12, lines 10-45, incorporated herein by reference. The molecular weight and molecular weight distribution measurements are described in U.S. Pat. No. 6,525,157, column 5, line 58 to column 6, line 21, incorporated herein by reference.

Another example of a propylene elastomer which may be used is a region-error containing propylene-ethylene copolymer (i.e., a R-EPE copolymer) as described in U.S. Patent Application Publication No. 2003/0204017 (published Oct. 30, 2003), incorporated herein by reference.

As disclosed in U.S. Patent Application Publication No. 2003/0204017 (published Oct. 30, 2003) paragraph [0006], the R-EPE copolymers may be characterized as comprising at least about 60 weight percent (weight percent) of units derived from propylene, about 0.1-35 weight percent of units derived from ethylene, and 0 to about 35 weight percent of units derived from one or more unsaturated comonomers, with the proviso that the combined weight percent of units derived from ethylene and the unsaturated comonomer does not exceed about 40. These copolymers are also characterized as having at least one of the following properties: (i) $^{13}C$ NMR peaks corresponding to a regio-error at about 14.6 and about 15.7 ppm, the peaks of about equal intensity, (ii) a B-value greater than about 1.4 when the comonomer content, i.e., the units derived from ethylene and/or the unsaturated comonomer(s), of the copolymer is at least about 3 weight percent, (iii) a skewness index, $S_{ix}$, greater than about −1.20, (iv) a DSC curve with a $T_{me}$ that remains essentially the same and a $T_{max}$ that decreases as the amount of comonomer, i.e., the units derived from ethylene and/or the unsaturated comonomer(s), in the copolymer is increased, or (v) an X-ray diffraction pattern that reports more gamma-form crystals than a comparable copolymer prepared with a Ziegler-Natta (Z-N) catalyst. Typically the copolymers of this embodiment are characterized by at least two, preferably at least three, more preferably at least four, and even more preferably all five, of these properties.

The test methods for the R-EPE are disclosed in U.S. Patent Application Publication No. 2003/0204017, filed May 5, 2002, incorporated by reference herein. The test method for the $^{13}C$ NMR measurements is described in U.S. Patent Application Publication No. 2003/0204017, paragraphs [0125] to [0138], incorporated by reference herein. The B-value measurement is described in U.S. Patent Application Publication No. 2003/0204017, paragraphs [0101] to [0106] and paragraphs [0445] to [0454], incorporated by reference herein. The test method for the comonomer concentration is described in U.S. Patent Application Publication No. 2003/0204017, paragraphs [0117] to [0138], incorporated by reference herein. The skewness index is described in U.S. Patent Application Publication No. 2003/0204017, paragraphs [0111] to [0116], incorporated by reference herein. The $T_{me}$ and $T_{max}$ measurements are described in U.S. Patent Application Publication No. 2003/0204017, paragraphs [0097] to [0100], and to [0116] incorporated by reference herein. The test method for the X-ray diffraction patterns is described in U.S. Patent Application Publication No. 2003/0204017, paragraphs [0125] to [0138], incorporated by reference herein.

Olefinic Block Copolymer/LOA/α-Olefin Interpolymer

Additional impact modifiers, which may be used alone or in combination with the other impact modifiers described herein, in the filled TPO composition and/or the polymeric masterbatch includes multi-block polymers having a plurality of blocks, including a hard block having a relatively high crystallinity and a soft block having a crystallinity lower than the hard block. Preferable multi-block polymers (e.g., the multi-block olefenic polymer) include homopolymer having essentially one (e.g., one) α-olefin monomer, copolymers having two α-olefin monomers, terpolymers having three or more monomers (which typically contain at least two monomers that are α-olefins and may even contain three α-olefins) or may contain four or more of α-olefin monomers, or any combination thereof. A multi-block homopolymer may contain relatively hard and soft blocks having the same monomer, the differences in the blocks being the regularity of the monomers (e.g., the hard block may have monomers which are more regularly oriented than the soft block, so that the hard block has a higher crystallinity). An olefinic block copolymer may contain blocks having different concentrations of monomers. For example, an olefinic block copolymer may have one or more relatively hard blocks which contains a high concentration (e.g., greater than about 80 weight percent, preferably greater than about 90 weight percent, more preferably greater than about 95 weight percent, and most preferably greater than about 99 weight percent, or even 100 weight percent of the olefinic block copolymer) of a first α-olefinic monomer and a low concentration of a second α-olefin monomer and one or more soft blocks which contain a concentration of the first α-olefin which is lower than the in the one or more hard blocks. Preferably the first α-olefin is a lower α-olefin (LOA) which is ethylene or propylene, such that the olefinic block copolymer is a LOA/α-olefin interpolymer. Without limitation, the olefinic block copolymer may be an ethylene/α-olefin interpolymer or a propylene/α-olefin interpolymer. Examples of LOA/α-olefin interpolymer which may be used in the second polymeric component are described in PCT International Patent Publication Nos. WO2006/102155A2 (filed Mar. 15, 2006), WO2006/101966A1 (filed Mar. 15, 2006), and WO2006101932A2 (filed Mar. 15, 2006), all of which are expressly incorporated herein by reference in there entirety. One particularly preferred class of LOA/α-olefin interpolymer are ethylene/α-olefin interpolymers.

Ethylene/α-olefin interpolymers suitable for use in the second polymeric component include ethylene and one or more copolymerizable α-olefin comonomers in polymerized form, characterized by multiple blocks or segments of two or more polymerized monomer units differing in chemical or physical properties (block interpolymer), preferably a multi-block copolymer.

Without limitation, exemplary ethylene/α-olefin interpolymers are disclosed for example in International Patent Application Publication No. WO2006/102155A2, see for example paragraphs [0037] to [0060], incorporated by reference herein. Preferred ethylene/α-olefin intermpolymers suitable for use in the filled TPO compositions, the polymeric masterbatch, or both may be characterized by a melting point, Tm, which is higher than the melting point of a random copolymer having the same density, d. Such polymers For example, the ethylene/α-olefin interpolymers may have at least one melting point, Tm, in degrees Celsius and density, d, in grams/cubic centimeter, wherein the numerical values of the variables correspond to the relationship: $Tm \geq 1000(d)-800$, and preferably $Tm \geq -2002.9+4538.5(d)-2422.2(d)^2$, and more preferably $6288.1+13141(d)-6720.3(d)^2$, and most preferably $Tm \geq 858.91-1825.3(d)+1112.8(d)^2$.

Preferably, the ethylene/α-olefin interpolymers suitable for use in the filled TPO composition, the polymeric masterbatch, or both, may further be characterized by a polydispersity index, Mw/Mn (measured e.g., by gel permeation chromatography), from about 1.7 to about 3.5 and at least one melting point.

Low Viscosity Thermoplastic Polymer

As described above, the filled TPO composition may include one or more low viscosity thermoplastic polymers (e.g., having a viscosity lower than the high viscosity polypropylene impact copolymer). One of the functions of the low viscosity polypropylene polymer may be to decrease the concentration of the filler, such that the filled TPO composition has a lower filler concentration than the polymeric masterbatch. As such, the one or more low viscosity polypropylene polymers may be referred to as a diluting polymer. The one or more low viscosity thermoplastic polymers may be polymers that are capable of being extruded, injection molded, or both. The low viscosity thermoplastic polymer preferably includes or consists substantially one or more polypropylene homopolymers, one or more polypropylene copolymers, one or more polyethylene homopolymers, or any combination thereof. Preferably the low viscosity thermoplastic polymer is a semi-crystalline thermoplastic. The low viscosity thermoplastic polymer preferably has a crystallinity about 10 weight percent or more, more preferably about 20 weight percent or more, even more preferably about 30 weight percent or more, and most preferably about 40 weight percent or more. The low viscosity thermoplastic polymer preferably has a crystallinity greater than the crystallinity of the impact modifier. Preferably the one or more low viscosity thermoplastic polymers is selected from one or more polypropylene polymers. The low viscosity polypropylene, the low viscosity thermoplastic polymers, or both may be free of atactic polypropylene or contain only small concentrations of atactic polypropylene. For example, the concentration of atactic polypropylene may be about 10 weight percent or less, preferably about 5 weight percent or less, more preferably about 1 weight percent or less, and most preferably about 0.2 weight percent or less, based on the total weight of the low viscosity thermoplastic polymer, based on the total weight of the filled TPO composition, or both.

Preferred low viscosity polypropylenes include polypropylene homopolymers, polypropylene copolymers containing greater than 50 weight percent propylene units, and combinations thereof. Particularly preferred low viscosity polypropylenes include isotactic polypropylene, and reactor blends of isotactic polypropylene with an elastomer (e.g., a reactor TPO). Random polypropylene copolymers may also be used. Preferred polypropylenes have a peak melting temperature of about 145 or more ° C., more preferably about 155 or more ° C., and most preferably about 160 or more ° C., as measured by differential scanning calorimetry. The peak melting temperature of the low viscosity polypropylene is preferably less than about 170° C. Preferred polypropylenes may have a melt flow rate of about 2 or more g/10 min, more preferably about 4 or more g/10 min, even more preferably about 6 or more, and most preferably about 8 or more g/10 min. The low viscosity polypropylene preferably has a melt flow rate less than about 1000 g/10 min, and more preferably less than about 125 g.10 min. Particularly preferred low viscosity thermoplastic polymers include polypropylene impact copolymers (e.g., a reactor TPO) which are ductile at about −40° C. (as determined for example by Notched Izod Impact Testing).

Filler

The filler is preferably an inorganic filler, and more preferably a mineral filler. Without limitations, exemplary inorganic filler which can be used in the present invention include fillers known to those skilled in the art useful for thermoplastic compositions and include, for example, alumina, barium sulfate, bentonite calcium carbonate, calcium hydroxide, calcium sulfate, calcium sulfite, carbon black, carbon fibers, clay, diatomaceous earth, graphite, magnesium carbonate, magnesium hydroxide, mica, microballoon, molybdenum, sericite, silica, silica sand, sodium sulfate, talc, titanium oxide, white sand, wollastonite, and zeolite. Among them, glass fibers, mica, talc, and wollastonite and the like are preferred for improving properties such as impact resistance at low temperature and moldability. One particularly useful mineral filler is talc (e.g., one that consists essentially of $3MgO.4SiO_2.H_2O$). The fillers are preferably particulated and may have any suitable median particle size. Preferably, the particle size is on the order of about 10 µm or smaller, more preferably about 7 µm or less, even more preferably about 5 µm or less, even more preferably about 3 µm or less, and most preferably about 2 µm or less. The fillers may be any suitable top-size particle size to allow flow of the filled TPO composition through a breaker plate, a screen pack, or both. Preferably the top-size particle size of the filler is on the order of about 50 µm or smaller, more preferably about 30 µm or less, and most preferably about 15 µm or less. The particulated filler may include filler in a laminar form, in a granular form, or in a fibrous form. Preferably the filler is in a laminar form, a granular form, or both. More preferably, at least 70 weight percent (e.g., at least 90 weight percent, or even at least 98 weight percent) of the filler is in a laminar form. In one aspect of the invention, the filler is substantially free, or even totally free of filler in a fibrous form. The amount of the filler that is in a fibrous form preferably is about 10 weight percent or less, more preferably about 1 weight percent or less, and most preferably about 0.1 weight percent or less. For purposes of illustration and without limitation, exemplary fillers having a laminar structure include talc and chlorite, exemplary fillers having a granular structure include dolomite and quartz, and exemplary fillers having a fibrous structure include asbestos and tremolite.

Additional Polymers

The filled TPO composition may optionally include one or more additional polymers known to those skilled in the art as used in TPO compositions, Preferred additional polymers include one or more additional polypropylenes (e.g., one or more additional low viscosity polypropylenes), one or more additional SLEPs, one or more additional propylene elastomers, one or more high density polyethylenes, one or more low density polyethylenes, one or more linear low density polyethylenes, one or more very low density polyethylenes, one or more ethylene vinyl acetate copolymers, one or more ethylene methacrylate copolymers, one or more ethylene butyl acrylate copolymers, and any combination thereof.

Additives

The filled TPO composition may include additives commonly known to the skilled artisan as used in filled TPO compositions. The filled TPO composition, the polymeric masterbatch or both may include an antistat compound. Without limitation, exemplary antistat compounds include a glycerol monostearate, an ethoxylated fatty acid amine, a diethanolamides, or any combination thereof. An antistat compound may be advantageously used to minimize segregation of pellet mixtures, for example in a hopper or while being transported or conveyed. Further description of antistat compounds which may be used in the present invention are disclosed in U.S. Patent Application No. 61/036,692, filed on Mar. 14, 2008, paragraphs [0137] to [0143], incorporated herein by reference, now PCT Application Publication No. WO2009/114761, published Sep. 17, 2009, incorporated herein by reference.

The filled TPO composition, the polymeric masterbatch or both may further include a fluoropolymer, such as a fibril forming fluoropolymer as disclosed in PCT Patent Application Publication No. WO2007/024541A2, published Mar. 1, 2007, page 12, line 18 to page 13, line 13, incorporated herein by reference. Suitable fluoropolymers include polytetrafluoroethylene (PTFE) and modifications thereof (such as an acrylic-modified PTFE); ethylene-propylene fluoride (FEP) polymer; and a perfluoroalkoxy (PFA) polymer. Of these PTFE is preferred. Especially preferred is fibril forming PTFE which is made by dispersion or emulsion polymerization process, in which the particles remain dispersed in the reaction mix during the polymerization. The particles fibrillate under the influence of shear forces while being mixed with the propylene polymer and polyolefin elastomer components of the propylene polymer composition of the present invention. Fibril forming fluoropolymers are well known in the art and are commercially available. Such compositions are described in U.S. Pat. Nos. 3,005,795; 3,142,665; 3,671, 487; 4,016,345; and 4,463,130. The teachings of these patents are incorporated herein by reference for purposes of describing these fluoropolymers. Commercially available types of PTFE include TEFLON™ PTFE fluorocarbon resin grades 6, 6C, 6CN, 60, 62, 64, 65, 67, and the like available from E.I. du Pont de Nemours & Co. and acrylic-modified PTFE include METABLEN™ A3000 and A3800 from Mitsubishi Rayon Co. Ltd.

If employed in the filled TPO composition, the concentration of the fluoropolymer preferably is about 0.01 weight percent or more, more preferably about 0.1 weight percent or more, even more preferably about 0.5 weight percent or more, and most preferably about 0.7 weight percent or more, based on the total weight of the weight of the filled TPO composition. If employed in the filled TPO composition, the concentration of the fluoropolymer preferably is about 5 weight percent or less, more preferably about 3 weight percent or less, even more preferably about 2 weight percent or less, and most preferably about 1.0 weight percent or less, based on the total weight of the filled TPO composition. When the level of fluoropolymer is within these ranges, flow marks of the filled TPO compositions may be further improved and the toughness, especially low temperature impact is excellent. It is preferable that the fibril forming fluoropolymer is dispersed in the filled TPO composition in a substantially uniform manner.

If employed in the polymeric masterbatch, the concentration of the fluoropolymer preferably is about 0.01 weight percent or more, more preferably about 0.1 weight percent or more, even more preferably about 1.0 weight percent or more, and most preferably about 2.0 weight percent or more, based on the total weight of the weight of the polymeric masterbatch. If employed in the polymeric masterbatch, the concentration of the fluoropolymer preferably is about 7 weight percent or less, more preferably about 5 weight percent or less, even more preferably about 4 weight percent, or less, and most preferably about 3 weight percent or less, based on the total weight of the polymeric masterbatch.

In one aspect of the invention, the polymeric masterbatch is substantially free, or even totally free of the fluoropolymer. As such, the improvements in the appearance and/or mechanical properties may be achieved without the use of a fluoropolymer.

Process for At-Press Compounding

One aspect of the present invention is directed to improved processes for making plastic articles, and articles made therefrom. In a broad aspect, the invention is directed to improved processes and articles made therefrom, which include the steps of a) providing as separate materials
  i) a low viscosity thermoplastic material (e.g., a polypropylene polymer such as a semi-crystalline polypropylene copolymer, a semi-crystalline polypropylene homopolymer, or both), and
  ii) a polymeric masterbatch comprising an admixture of about 35 weight percent or more inorganic filler based on the total weight of the polymeric masterbatch, a high viscosity polypropylene impact copolymer having a highly crystalline portion, wherein the highly crystalline portion is present from about 20 weight percent to about 90 weight percent of the high viscosity polypropylene impact copolymer, and a xylene soluble portion, wherein the xylene soluble portion is present from about 10 weight percent to about 80 weight percent of the high viscosity polypropylene impact copolymer and has a z-average molecular weight of about 1,500,000 Da or more, a number average molecular weight of about 100,000 Da or less, and a polydispersity index of about 5 or more (preferably about 7 or more, and more preferably about 9 or more), and a linear or substantially linear ethylene polymer (SLEP) having a polydispersity index of about 3.5 or less, and a melt flow rate of about 40 or more g/10 min as measured according to ASTM D-1238 at 190° C./2.16 kg;

b) applying a shear force to the materials, while the materials are at an elevated temperature for blending the materials to form a molten blend;

c) shaping the molten blend; and d) solidifying the molten blend.

Desirably, the process is free of a step of compounding together the low viscosity thermoplastic material and the polymeric masterbatch prior to the blending step, and specifically is free of a prior compounding step that includes a melt blending step.

The process may include a step of providing one or more additional materials, such as one or more additional impact modifiers previously described.

Although the concentrations of the low viscosity thermoplastic material and the polymeric masterbatch may vary greatly, the concentration of the polymeric masterbatch preferably is about 70 weight percent or less, more preferably about 50 weight percent or less, and most preferably about 30 weight percent or less, based on the total weight of the molten blend. The low viscosity thermoplastic material is preferably present at a concentration of about 30 weight percent or more, more preferably about 50 weight percent or more, and most preferably about 70 weight percent or more, based on the total weight of the molten blend.

Any of the masterbatches described herein may be used in the process, and the process may result in a molten blend having any of the compositions as described herein for the filled TPO compositions. As such, the molten blend preferably contains about 35 weight percent or less filler (e.g. talc), preferably about 5-25 weight percent filler, and most preferably about 10-20 weight percent filler based on the total weight of the molten blend. Furthermore, articles shaped using the presently disclosed process may have one or more sections having a composition as described herein for the filled TPO compositions.

From the above, it can be seen that the step of shaping the molten blend can be performed using any one or combination of a number of art-disclosed techniques for making shaped articles. By way of example, the shaping can be done by blow molding, injection molding, or any combination thereof. In general, such step advantageously employs a suitable apparatus for imparting a shear force to the feedstock, particularly at an elevated temperature, so that a molten blend is obtained. By way of example, a typical approach employs an apparatus having a screw and barrel assembly, into which the feedstock (e.g., pellets of each of the low viscosity thermoplastic material and the polymeric masterbatch) is fed, such as by introduction directly from a storage container(s) and via a hopper (e.g., a mixing hopper). As material advances along a screw within the screw and barrel assembly, it will be mixed by dispersive mixing, by distributive mixing or both. A mixing arm may be employed for dry mixing pellets of the first and second materials. Suitable feeders may be used such as a gravimetric feeder, with or without weigh scale blender (e.g., available from Maguire).

The pellets of the low viscosity thermoplastic material and the polymeric masterbatch are sized generally similar to each other. For example, it is desirable that at least 50% (and more specifically at least about 65%) by weight of the pellets of both the low viscosity thermoplastic material and the pellets of the polymeric masterbatch are substantially the same size. Same sized as used in this paragraph means that the average of their respective longest dimensions are within about 30%, or even within 15% variation of each other.

As desired, the material may be subjected to a mixing flight that includes at least one undercut for providing dispersive mixing, at least one bypass channel for providing distributive mixing or both. After forming a desired blend, the blended material is expelled from the apparatus, such as through an optional mixing nozzle, and brought into contact with a tool wall for defining the shape of the desired article.

Examples of processing conditions useful in accordance with the present invention are disclosed, without limitation, in U.S. Provisional Patent Application Ser. No. 60/745,116, hereby incorporated by reference, now U.S. Patent Application Publication No. US 2007/0246862 A1, herein incorporated by reference. By way of illustration, and without intending to be limited thereby, a screw and barrel assembly as used herein may be of any suitable dimensions for accomplishing the desired results. In one approach, wherein the blending step occurs within the screw and barrel assembly, the screw and barrel assembly preferably has a length to diameter ratio of about 5:1 or more, more preferably about 10:1 or more, even more preferably about 15:1 or more, and most preferably from about 15:1 to about 25:1.

Another consideration that may be employed during blending within a screw and barrel assembly, according to the teachings herein, is the selection of an appropriate back pressure (namely the pressure applied to the plastic during screw recovery), the screw compression ratio, or both. By way of example, in one illustrative aspect, a back pressure of about 6 bar or more is applied to the first, second and third materials during the blending step, a screw compression ratio of greater than about 1:1 is employed, or a combination of both. The back pressure is more preferably about 10 bar or more, even more preferably about 25 bar or more, and most preferably about 70 bar or more, Higher and lower values of the back pressure are also possible. The compression ratio preferably is about 2:1 or more, more preferably about 2:1 or more, and most preferably about 2.4:1 or more. The compression ration preferably is about 3.5:1 or less. Higher and lower values of the compression ratio are also possible.

It may be desirable to employ a screw speed of about 20 to 400 rpm, more specifically about 50 to about 250 rpm, and still more specifically about 100 to about 200 rpm (e.g. about 160 rpm), during the blending step.

The blending step may occur at any suitable melt set point temperature for the particular machine employed. For example, it may occur at a melt set point temperature for the machine of about 160 to about 300° C., and more specifically at about 210 to about 255° C., and still more specifically at about 220 to about 240° C.

Optionally, the injecting step includes passing the blend through a static mixer, such as a mixing nozzle (e.g., an interfacial surface generating mixing nozzle).

A variety of art-disclosed screw designs may be employed to achieve good mixing, with high performance designs being particularly attractive. One feature of high performance designs is the presence of two or more channels with varying channel dimensions along the length of the screw. This variation in channel dimension forces material to flow between channels, resulting in improved mixing. For example, distributive mixing may be accomplished by cutting and folding a polymer melt stream whereas dispersive mixing may be accomplished by forcing a polymer melt stream through a restrictive channel. Some examples of high performance screws consist of but are not limited to Energy Transfer (ET) screws, double wave screws, Stratablend™ screws, and Uni-Mix™ screws. Secondary mixing devices may also be employed to improve mixing. These secondary mixing devices may be incorporated into the screw design (dynamic mixer) or they may be incorporated downstream of the screw (static mixer). Some examples of dynamic mixers consist of but are not limited to one or more of a Maddock-style mixers, blister mixers, spiral dam mixers, pin mixers, and mixing rings. Some examples of static mixers consist of but are not limited to Kenics™ mixers, interfacial surface generator (ISG) mixers, and Koch™ mixers. In the case of injection molding, such static mixer designs can be incorporated into the nozzle and they are referred to as mixing nozzles.

As can be seen from the above, though a compounding process that includes melt blending the starting materials may optionally be employed in advance of feeding the materials into the apparatus, a particularly desired approach is to omit such step. Thus, the process may be substantially free of a step of compounding together the low viscosity thermoplastic material and the polymeric masterbatch prior to the blending step. For example the process may be substantially free of a step of compounding together the low viscosity thermoplastic material and the polymeric masterbatch prior to a step of conveying the low viscosity thermoplastic material and the polymeric masterbatch in a heated screw and barrel (e.g., heated above the melting temperature of the low viscosity thermoplastic material and/or the polymeric masterbatch) of a molding machine, a profile extrusion machine, a sheet extrusion machine, or a blow molding machine.

The articles in accordance with the present invention find use in a number of applications. Among them, are applications in which polyolefinic materials, and particularly thermoplastic polyolefins, are employed. For example, the materials made according to the teachings herein find attractive application in transportation vehicles as an interior or exterior component, such as bumpers, fascias, exterior trim, grilles, side skirts, spoilers, air dams, cladding, interior trim panels, knee bolsters, instrument panels, handles, or the like. The articles may be shaped and will consist essentially of the materials according to the teachings herein. They may be part of an assembly as well. It is possible for example that a shaped article made according to the teachings herein is laminated to another structure, such as by weld, adhesive bond, fastener or any combination thereof. It is also possible that articles may be part of an overmolded or co-injection molded assembly.

Examples of bonding agent systems suitable for use herein include, without limitation, cyanacrylates, (meth) acrylics, polyurethanes, silicones, epoxies, or the like. One particularly attractive adhesive includes an organoborane/amine complex, such as disclosed in U.S. Pat. Nos. 6,710,145; 6,713,579; 6,713,578; 6,730,759; 6,949,603; 6,806,330; and Published U.S. Patent Application Nos. 2005-0004332, 2005-0137370; 2008-0090981, 2008-0045680, and 2008-0045681, all of which are hereby expressly incorporated by reference.

The articles may be suitably treated in a secondary operation as well for improving their properties. By way of example, without limitation, they may be coated or otherwise surface treated. For example, in one embodiment, the surfaces of a body can optionally undergo a preliminary treatment prior to attachment to another body. This optional treatment can include cleaning and degreasing, plasma coating, corona discharge treating, coating with another surface treatment, coated with a bonding agent, or any combination thereof. In one embodiment, a body may be subject to a carbon-silica based plasma deposited coating, e.g., as described in U.S. Pat. No. 5,298,587; U.S. Pat. No. 5,320,875; U.S. Pat. No. 5,433,786 and U.S. Pat. No. 5,494,712, all hereby incorporated herein by reference. Other surface treatments might also be employed such as plasma surface treatment pursuant to art disclosed teachings as found in U.S. Pat. No. 5,837,958, incorporated herein by reference. In-mold decoration may also be employed.

Test Methods

Multiaxial or Instrumented Dart Impact (IDI) Energy measurements are according to ASTM D3763. For illustration purposes, multi-axial dart impact testing (Instrumented Dart Impact) is run on an MTS 810 High Rate instrument using a 2000 lb load cell. All specimens are approximately four inch diameter disks that are about 0.125 inch thick. The disks are impacted at about 6.7 meters/second using an approximately 13 mm tip. The outer 0.5 inch is screw-clamped, leaving about 3" of test area. A ductile break (denoted herein by a designation "D") leaves a clean hole punched through the center of the part with plastic drawn up to that hole, and no cracks extending radially out visible to the naked eye. The test is repeated on ten specimens to obtain the percent of failures that are ductile. Typical test temperatures include 20° C., 0° C., –15° C., –30° C., and –40° C. The reported results are generally an average of 10 samples.

Percent crystallinity herein can be measured by differential scanning calorimetry, according to ASTM D 3418.03 or ISO 11357-3. By way of example, a milligram size sample of polymer is sealed into an aluminum DSC pan. The sample is placed into a DSC cell with a 25 cubic centimeter per minute nitrogen purge and cooled to –100 C. A standard thermal history is established for the sample by heating at 10° C./minute to 225° C. The sample is then cooled (at 10° C./minute) to –100° C. and reheated at 10° C./minute to 225° C. The observed heat of fusion for the second scan is recorded ($\Delta H_{observed}$). The observed heat of fusion is related to the degree of crystallinity in weight percent based on the weight of the sample by the following equation:

$$\% \text{ Crystallinity} = \frac{\Delta H_{observed}}{\Delta H_{known}} \times 100,$$

where the value for $\Delta H_{known}$ is a literature reported established reference value for the polymer. For example, heat of fusion for isotactic polypropylene has been reported in B. Wunderlich, Macromolecular Physics, Volume 3, Crystal Melting, Academic Press, New York, 1980, p. 48, is $\Delta H_{known}$=165 Joules per gram of polypropylene polymer; and the heat of fusion for polyethylene has been reported in F. Rodriguez, Principles of Polymer Systems, $2^{nd}$ Edition, Hemisphere Publishing Corporation, Washington, 1982, p. 54, is $\Delta H_{known}$=287 Joules per gram of polyethylene polymer. The value of $\Delta H_{known}$=165 J/g may be used for polymers containing greater than about 50 mole percent propylene monomer and the value of $\Delta H_{known}$=287 J/g may be used for polymers containing greater than about 50 mole percent ethylene monomers.

Melting temperature may also be measured using differential scanning calorimetry using the above conditions. Unless otherwise defined, the melting temperature refers to the peak melting temperature.

Notched Izod Impact measurements are according to ISO 180 (method 1A). Typical test temperatures include about 20° C., 0° C., −15° C., and −30° C. The reported results are generally an average of 5 samples.

Glass transition temperature ($T_g$) is measured by compression molding elastomer samples and performing a temperature ramp using a Rheometrics Dynamic Mechanical Spectrometer. The glass transition temperature is defined as the temperature at the tan delta peak. Solid State Testing is done under liquid nitrogen environment, with torsion fixtures, in dynamic mode. A temperature ramp rate of 3° C./min is used, with a frequency of 1 rad/sec, and an initial strain of 0.1%. Average sample dimensions have a length of 45.0 mm, width of 12.6 mm, and thickness of 3.2 mm.

Unless otherwise noted, flexural modulus is measured according to ISO 178 (at a rate of about 2.0 mm/min with a span of about 10 cm at 20° C. and the reported results are generally an average of 5 samples, ultimate tensile strength, tensile strength at yield, ultimate elongation, tensile modulus, and elongation at yield are measured according to ISO 527-1, -2 (at a strain rate of about 50 mm/min and the reported results are generally an average of 6 samples), and Brookfield viscosity is measured according to ISO 2555.

Unless otherwise specified, the density may be measured according to ASTM D 792-00.

Unless otherwise specified, the ethylene and/or comonomer content may be measured using infrared spectroscopy according to ASTM D-2238, Method B.

Durometer hardness is measured according to ASTM D 2240-05 (using e.g., the Shore A hardness scale).

Heat Distortion Temperature (HDT) is measured according to ISO 75 using a load of about 66 psi. The reported results are generally an average of 4 samples.

Melt flow rate (i.e. melt index), $I_2$, may be measured according to ISO 1133 at a load of 2.16 kg. Unless otherwise specified, the measurement temperature is 230° C. when testing polypropylenes (including polypropylene copolymers containing at least about 55 weight percent propylene monomer), the filled TPO compositions, and the polymeric masterbatch, and the measurement temperature is 190° C. when testing polyethylenes including ethylene copolymers (e.g., SLEPs) containing at least about 45 weight percent ethylene monomer. For polyethylene containing polymers, the melt flow rate may be referred to as melt index.

The melt flow ratio for may be measured according to ISO 1133 and is calculated as the ratio of the melt flow rate at a load of 10.0 kg ($I_{10}$) and the melt flow rate at a load of 2.16 kg ($I_2$). Thus the melt flow ratio is calculated as quotient of $I_{10}/I_2$. Unless otherwise specified, the measurement temperature is 230° C. when testing polypropylenes, the filled TPO compositions, and the polymeric masterbatch, and the measurement temperature is 190° C. when testing polyethylenes including ethylene copolymers (e.g., SLEPs) containing at least about 40 weight percent ethylene monomer.

Tiger Striping may be visually observed on molded plaques. The number of tiger stripes, if any, may be visually counted and the ease of observing the tiger stripes, may be described qualitatively.

EXAMPLES

The following examples illustrate various aspects of the present invention. The values shown are approximate and should not be regarded as limiting of the inventions. Variations in the processing parameters are possible as disclosed throughout the specification. In addition, the results shown may vary as well (e.g., by +/−10% of the stated values or even higher).

Comparative Example (C.E.) MB-1 and Examples(EX.) MB-2 to MB-7

Masterbatches C.E. MB-1 and EX. MB-2 to MB-7 are prepared using the compositions given in TABLE 1. The HVPIC-1 is a high viscosity polypropylene impact copolymer having a density of about 0.89 g/cm³ (as measured according to ISO 1183), a tensile strength at yield of about 23 MPa and an ultimate elongation >500% (both)measured according to ISO 577, -1, -2), a flexural modulus of about 850 MPa (as measured according to ISO 178) and a melt flow rate of about 1.2. HVPIC-1 is commercially available from LyondelBassel Industries as HIFAX® X1956A. The SLEP-1 is an ethylene-octene copolymer having, a density of about 0.870 g/cm³, (as measured according to ASTM D792), a tensile strength of about 1.55 MPa and an ultimate elongation of about 106% (both measured according to ASTM D638), a melt flow rate estimated at about 500 g/10 min, a glass transition temperature of about −58° C., a final melting temperature of about 68° C. (as measured by differential scanning calorimetry) and a Brookfield Viscosity of about 8200 cps (as measured according to ASTM D1084). SLEP-1 is commercially available from Dow Chemical Company as Affinity GA1900. Talc-1 is a particulated talc (99-100 weight percent of the particles are laminar in structure, less than 1% are granular in structure, and there are no detectable fibrous particles), having a median particle size of about 1.9 μm, and 98 weight percent of the particles are less than about 10 μm. Talc-1 is commercially available from Imifabi S.p.A. as HTP 1c. The masterbatches also contain less than 3 weight percent of CC-1, a color concentrate in a polypropylene carrier.

The masterbatches are prepared in a ZSK-25 twin screw extruder having a screw length of 1152 mm, at a screw speed of 275 rpm, and a throughput rate if about 8 kg/hour. Half of the filler (talc) is added in the feed throat and the other half of the filler is added in a side feeder. The die pressure ranges from 46 to 89 bar, and the melt temperature was about 210° C.

The specific energy increases from about 1080 J/g to about 1420 J/g as the talc concentration increased from 0% to 70 weight percent.

The molecular weight of the xylene soluble fraction is measured for each masterbatch using gel permeation chromatography. The xylene soluble fraction is obtained by first placing the polymeric masterbatches placed in xylene and heating to dissolve the polymer. The xylene solution is then cooled to room temperature. Upon cooling, the xylene insoluble portion precipitates. This xylene insoluble portion is removed by filtration and the remaining xylene soluble fraction is analyzed. The number average (Mn), weight average (Mw) and z-average (Mz) molecular weights of the xylene soluble portion are measured by gel permeation chromotagrophy (GPC) using a Waters GPCV2000. The molecular weights are calculated on the basis of 100% polyethylene. The GPC is calibrated using standards and the relative standard deviations for Mn and Mw are calculated as 2.9% and 0.57 percent respectively. The number average, weight average, and z-average molecular weights (expressed in Daltons, based on 100% polyethylene) are listed in Table 1. For example the xylene soluble fraction of EX. MB-3 has a number average molecular weight (Mn) of about 17,300 Da, a weight average molecular weight (Mw) of about 363,000 Da, and a z-average molecular weight (Mz) of about 1,768,000 Da.

The xylene soluble fraction of the HVPIC-1 is measured to have Mn of about 65,800 Da, Mw of about 620,000 Da, and Mz of about 2,183,000 Da. SLEP-1 is measured to have a significantly lower molecular weight distribution and a narrower molecular weight distribution. The SLEP-1 has Mn of about 12,100 Da, Mw of about 24,000 Da, and Mz of about 38,000 Da.

Comparative Example MB-8 is prepared similarly to the above masterbatches. MB-8 is prepared without the HVPIC, and includes SLEP-1 at a concentration of about 29 weight percent as given in TABLE 1.

TABLE 1

COMPOSITIONS OF POLYMERIC MASTERBATCH SAMPLES

|  | C.E. MB-1 | EX. MB-2 | EX. MB-3 | EX. MB-4 | EX. MB-5 | EX. MB-6 | EX. MB-7 | C.E. MB-8 |
|---|---|---|---|---|---|---|---|---|
| Talc-1 | 0.0% | 20.0% | 30.0% | 40.0% | 50.0% | 60.0% | 70.0% | 70.0% |
| HVPIC-1 | 66.0% | 50.7% | 44.3% | 38.0% | 31.7% | 25.3% | 19.0% |  |
| SLEP-1 | 33.0% | 26.6% | 23.4% | 20.0% | 16.6% | 13.4% | 10.0% | 29.0% |
| CC-1 | 1.0% | 2.7% | 2.3% | 2.0% | 1.7% | 1.3% | 1.0% | 1.0% |
| Total | 100% | 100% | 100% | 100% | 100% | 100% | 100% | 100% |
| Molecular weights in thousands |
| Mn | 24.6 | 24.9 | 17.3 | 21.6 | 18.5 | 21.4 | 21.2 |  |
| Mw | 414 | 387 | 363 | 339 | 305 | 264 | 182 |  |
| Mz | 1,455 | 1,266 | 1,236 | 1,126 | 964 | 687 | 365 |  |

Examples MB-9 to MB-12

Masterbatch samples EX. MB-9 to EX. MB-12 are prepared using the compositions given in TABLE 2. Talc-2 is a particulated talc available under the designation JETFIL® 7 C. The Additives-1 additives package includes CHIMASORB® 119, IRGANOX® B225, and erucamide, at a 1:2:3 ratio. LVPP-1 is a relatively low viscosity polypropylene impact copolymer. LVPP-1 is characterized by a melt flow rate of about 44 g/10 min (measured according to ISO 1133), a density of about 0.9 g/cm$^3$ (as measured according to ISO 1183), a flexural modulus of about 1450 MPa (as measured according to ISO 178) a tensile strength at yield of about 28 MPa and a tensile elongation at yield of about 7% (both measured according to ISO 527, -2), a Vicat Softening Point A of about 152° C. (as measured according to ISO 306/A at 10 N), and a CHARPY notched impact strength of about 4 kJ/m$^2$ (as measured according to ISO 179-1//1eA at −20° C.). LVPP-1 is commercially available from DOW CHEMICAL CO. as Polypropylene C705-44.

Masterbatch samples EX. MB-9 to EX. MB-12 are prepared using the process as C.E. MB-1. The molecular weight distributions of the MB-9 to MB-12 are measured using gel permeation chromatography. The z-average molecular weight is plotted as a function of the SLEP-1 concentration in FIG. 1. As the concentration of SLEP-1 increases, the z-average molecular weight generally increases. This may be due to reduced degredation during the processing of the masterbatch when the low viscosity SLEP-1 is employed.

TABLE 2

COMPOSITIONS OF POLYMERIC MASTERBATCH SAMPLES

|  | EX. MB-9 | EX. MB-10 | EX. MB-11 | EX. MB-12 |
|---|---|---|---|---|
| Talc-2 | 60.0% | 60.0% | 60.0% | 60.0% |
| Additives-1 | 1.9% | 1.9% | 1.9% | 1.9% |
| LVPP-1 | 14.42% | 9.42% | 4.42% |  |
| HVPIC-1 | 23.68% | 23.68% | 23.68% | 23.68% |
| SLEP-1 |  | 5.0% | 10.0 | 14.42% |
| Total | 100% | 100% | 100% | 100% |

Examples TPO-1 to TPO-8

Filled TPO compositions are prepared by dry blending a polypropylene (LVPP-2) with either masterbatch EX. MB-7, or masterbatch C.E. MB-8 using the concentrations listed in TABLE 3A. LVPP-2 is a developmental polypropylene characterized by a melt flow rate of about 9.7 g/10 min (measured according to ASTM D1238), a specific gravity of about 0.89 g/cm$^3$ (as measured according to ASTM D792), a flexural modulus (1% secant) of about 950 MPa (as measured according to ASTM D790A), an ultimate tensile strength of about 927 MPa and an ultimate elongation of about 106% (both measured according to ASTM D638). LVPP-2 is a reactor TPO polypropylene having ductility at −40° C. as determine by Instrumented Dart Impact Testing and was supplied by DOW CHEMICAL CO. under the developmental product designation Polypropylene D143.00.

The dry blends are fed into the hopper of an injection molding machine and A4 size injection molded plaques (having dimensions of about 3 mm×about 300 mm×about 200 mm) are prepared without a step of melt compounding the polymeric masterbatch and the LVPP-2 polypropylene prior to feeding into the screw and barrel assembly of the injection molding machine. The screw and barrel assembly of the injection molding machine are heated and provide shear for melt blending. A Krauss Maffei 300-140 C2 injection molding machine having a screw diameter of about 45 mm is used to mold the plaques using the following molding conditions:

Barrel Temperatures (from nozzle to feedthroat):
  190-250° C. (e.g. 225)
  200-260° C. (e.g. 230)
  200-240° C. (e.g. 220)
  170-230° C. (e.g. 215)
  170-230° C. (e.g. 205)
  40-95° C. (e.g. 55)
Tool Temperature: 35-50° C. (e.g. 40°)
Hot Runner Temperature:
  190-230° C. (e.g. 210° C.)
Dosing Speed: 50-150 rpm (e.g. 100 rpm)
Back Pressure: 4-80 bar (e.g. 7 bar)
Dosing Stroke: 120-180 mm (e.g. 150 mm)
Switchover Point: 15-25 mm (e.g. 17 mm)
Holding Pressure: 20-25 bar (e.g. 22 bar)
Holding Time: 7-20 sec (e.g. 12 sec)
Injection Speed: 20-50 mm/sec (e.g. 35 mm/sec)
Cooling time: 30-40 sec (e.g. 35 sec)
Total Cycle time: +/−60 sec (according to ISO standard)

Figure 2:
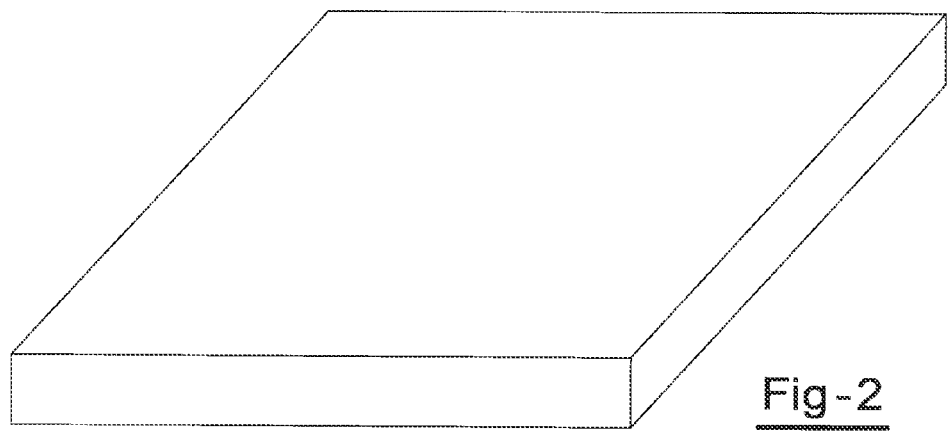
FIG. 2 illustrates an example of an injection molded plaque prepared by at-press blending a polypropylene and 10% of a talc MB which is free of a high viscosity polypropylene impact copolymer.
Figure 3:
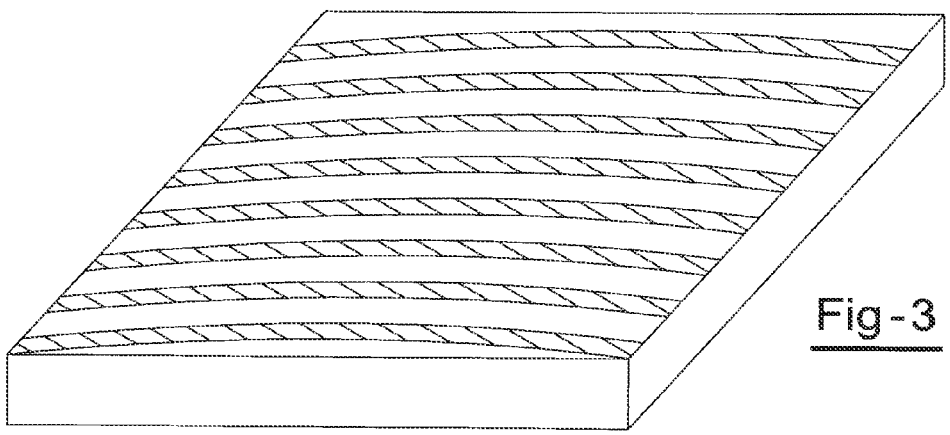
FIG. 3 illustrates an example of an injection molded plaque prepared by at-press blending a polypropylene and 10% of a talc MB which contains a high viscosity polypropylene impact copolymer.
Figure 4:
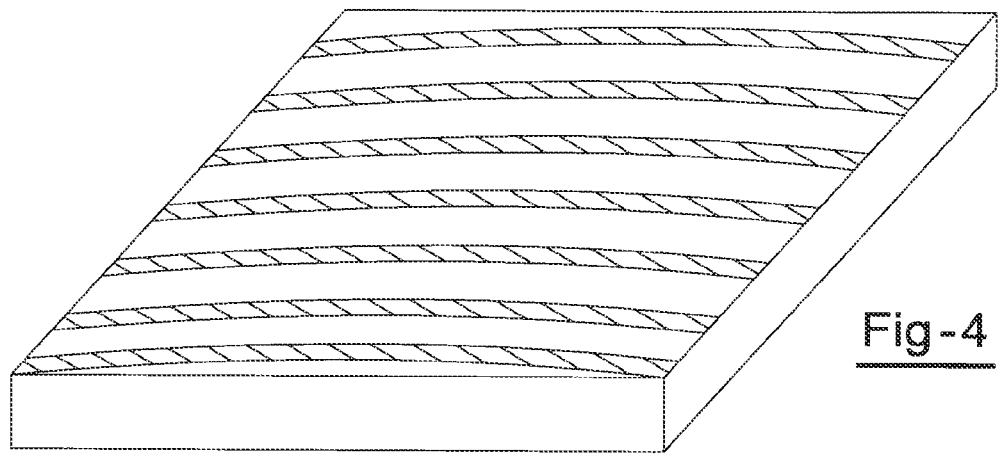
FIG. 4 illustrates an example of an injection molded plaque prepared by at-press blending a polypropylene and 20% of a talc MB which is free of a high viscosity polypropylene impact copolymer.
Figure 5:
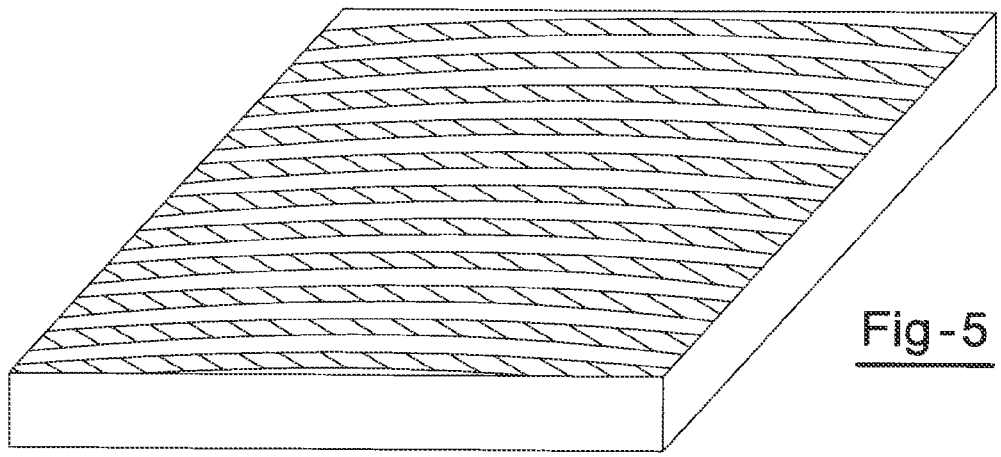
FIG. 5 illustrates an example of an injection molded plaque prepared by at-press blending a polypropylene and 20% of a talc MB which contains a high viscosity polypropylene impact copolymer.
Figure 6A:
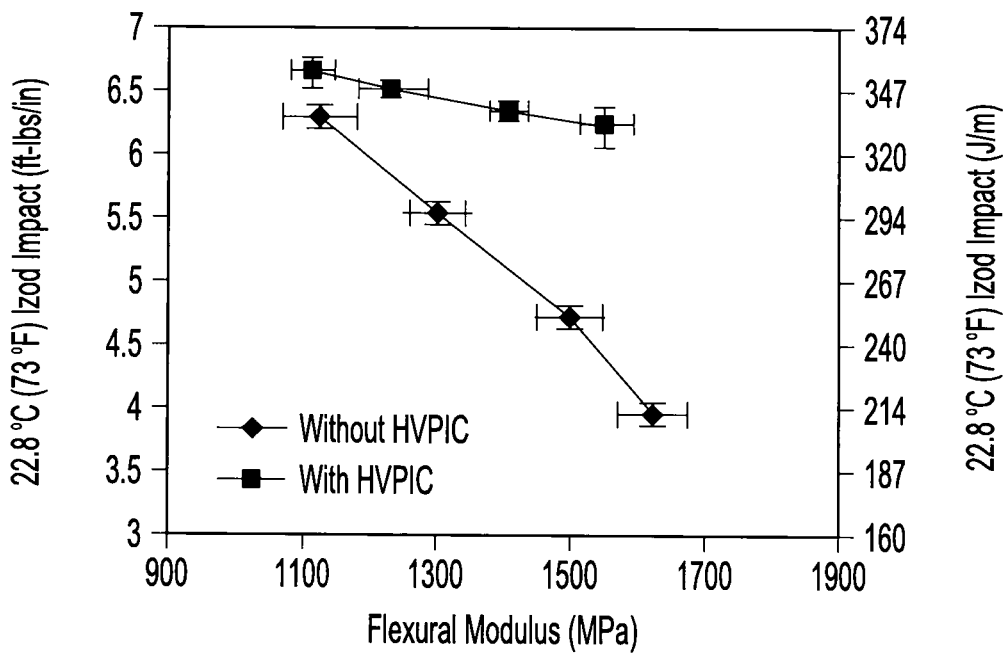
FIGS. 6A, 6B, 6C, and 6D illustrate the relationship between the impact strength, measured by the Izod impact test, tested at about 23° C., about 0° C., about −20° C., and about −30° C., respectively, and the flexural modulus for illustrative filled TPO compositions made with and without a high viscosity polypropylene copolymer.
Figure 6B:
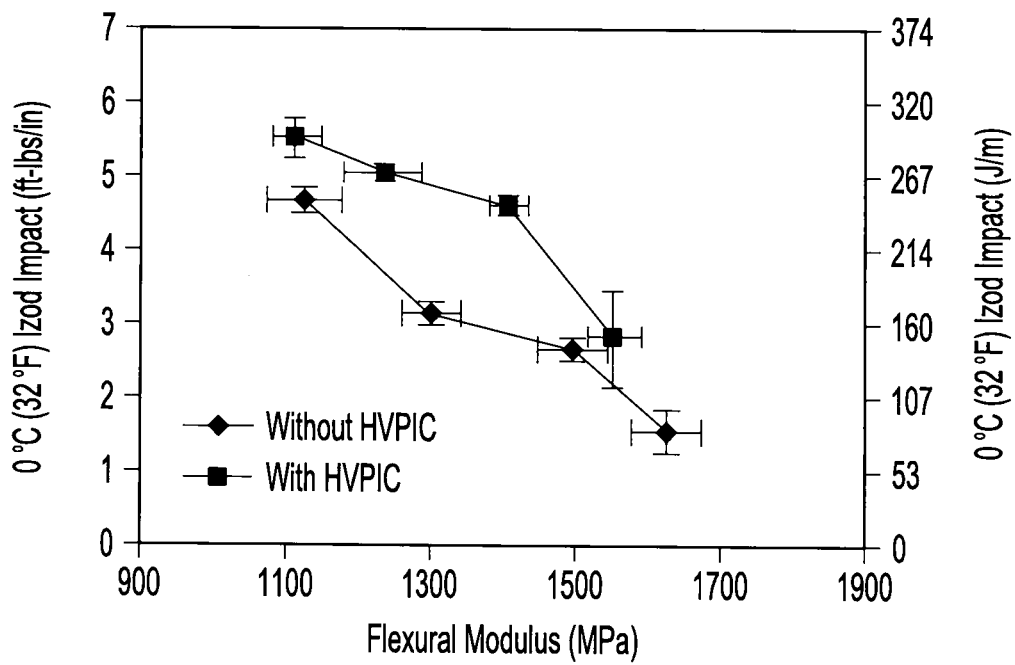
Figure 6C:
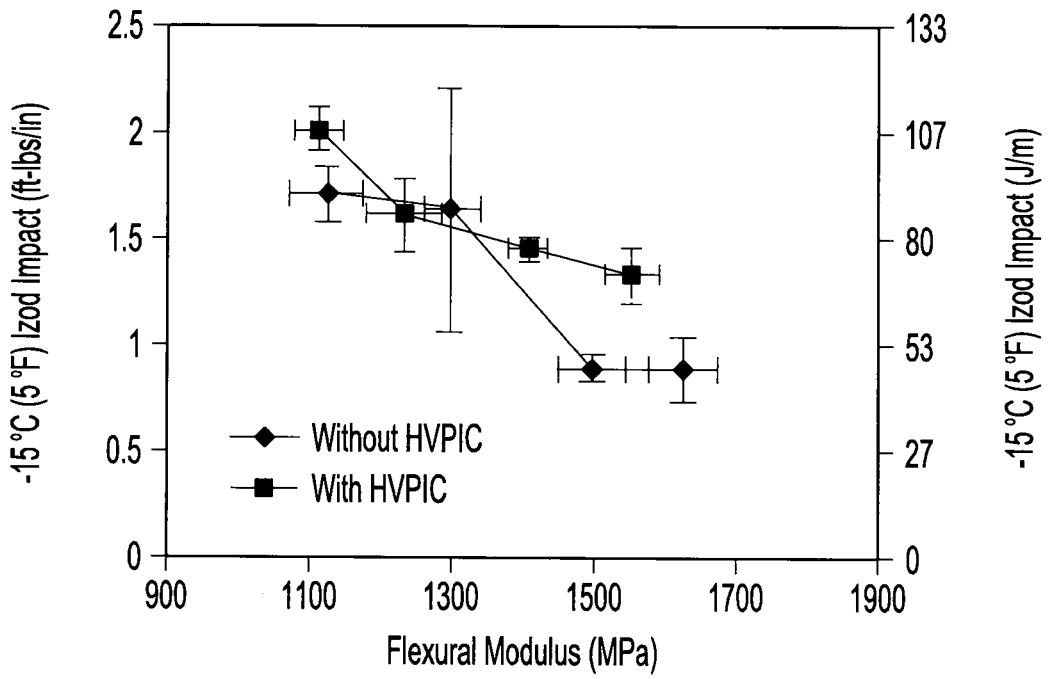
Figure 6D:
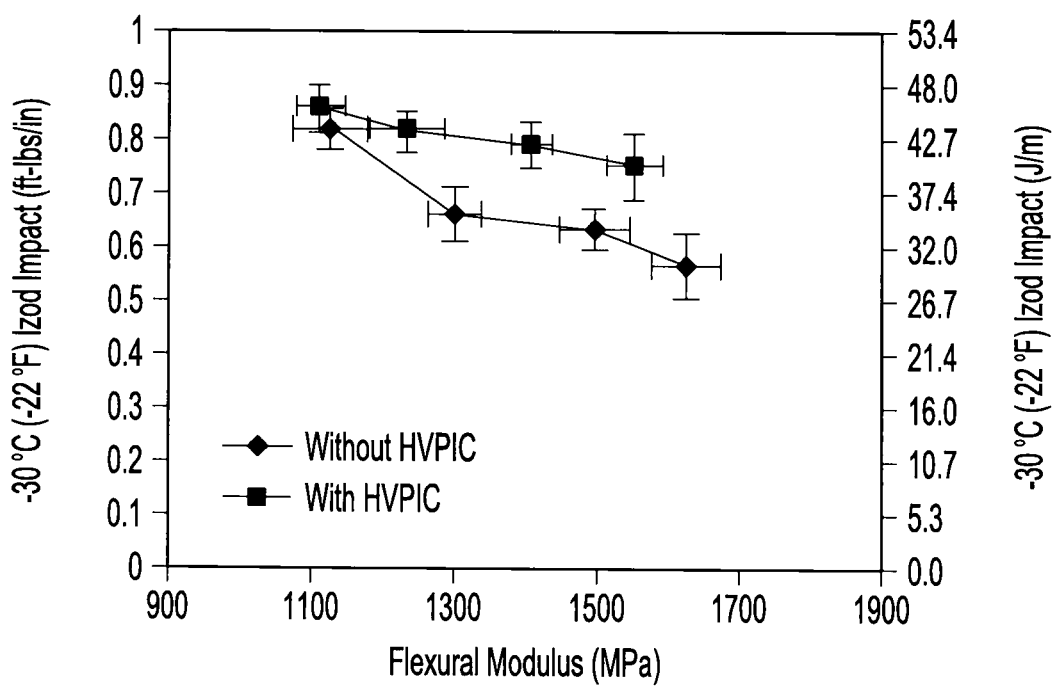

The plaques made using MB-7 (e.g., EX. TPO-1,3,5, and 7), and including the high viscosity polypropylene impact copolymer have improved surface aesthetics, including reduced tiger striping, than the similarly prepared injection molded plaques made using MB-8 (e.g., C.E. TPO-2,4,6, and 8). For example, the surfaces of the plaques of EX. TPO-3 and C.E. TPO-4 are illustrated in FIG. 2 and FIG. 3 respectively. Similarly, the surfaces of the plaques of EX. TPO-7 and C.E. TPO-8 are illustrated in FIG. 4 and FIG. 5 respectively.

Figure 7A:
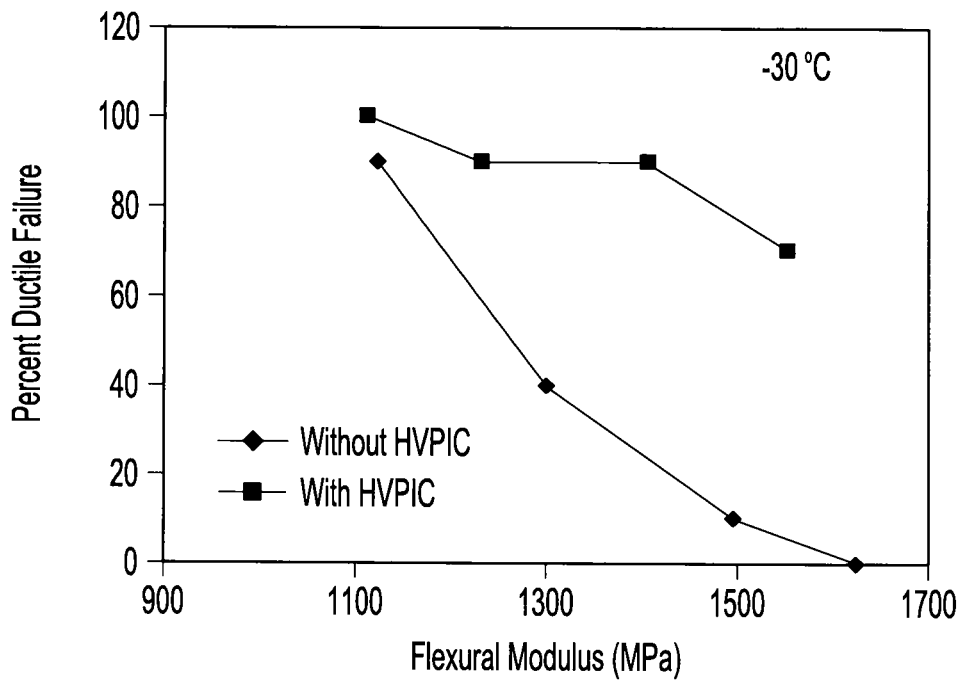
FIGS. 7A and 7B illustrate the relationship between percent ductile failure, measured by the dart impact test at about −30° C. and about −40° C. respectively, and the flexural modulus for illustrative filled TPO compositions made with and without a high viscosity polypropylene copolymer.
Figure 7B:
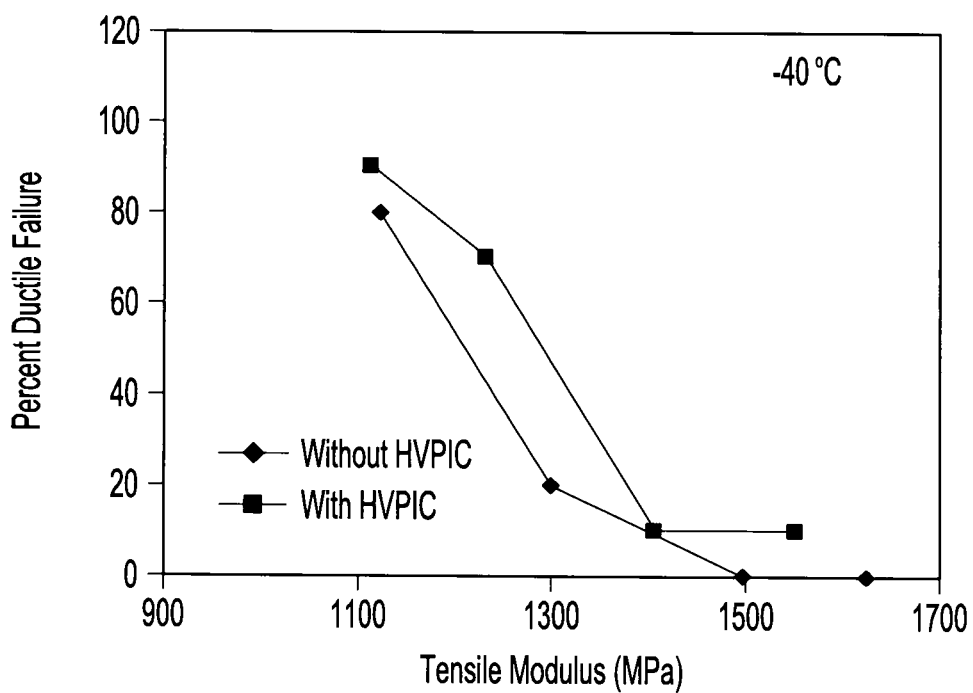
Figure 7C:
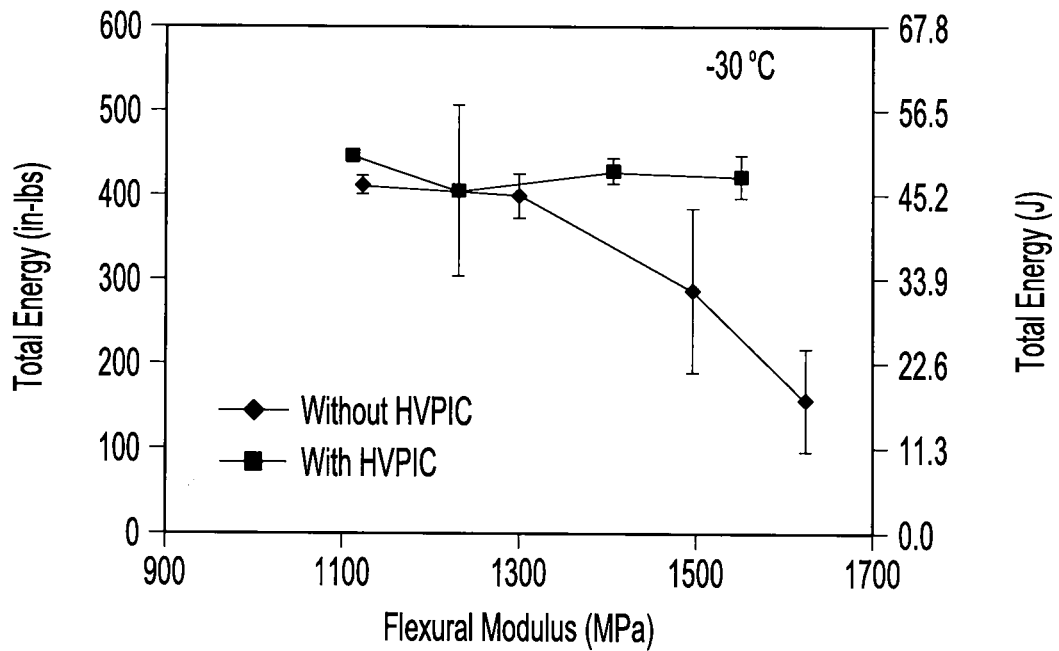
FIGS. 7C and 7D illustrate the relationship between total impact energy, measured by the dart impact test at about −30° C. and about −40° C. respectively, and the flexural modulus for illustrative filled TPO compositions made with and without a high viscosity polypropylene copolymer.
Figure 7D:
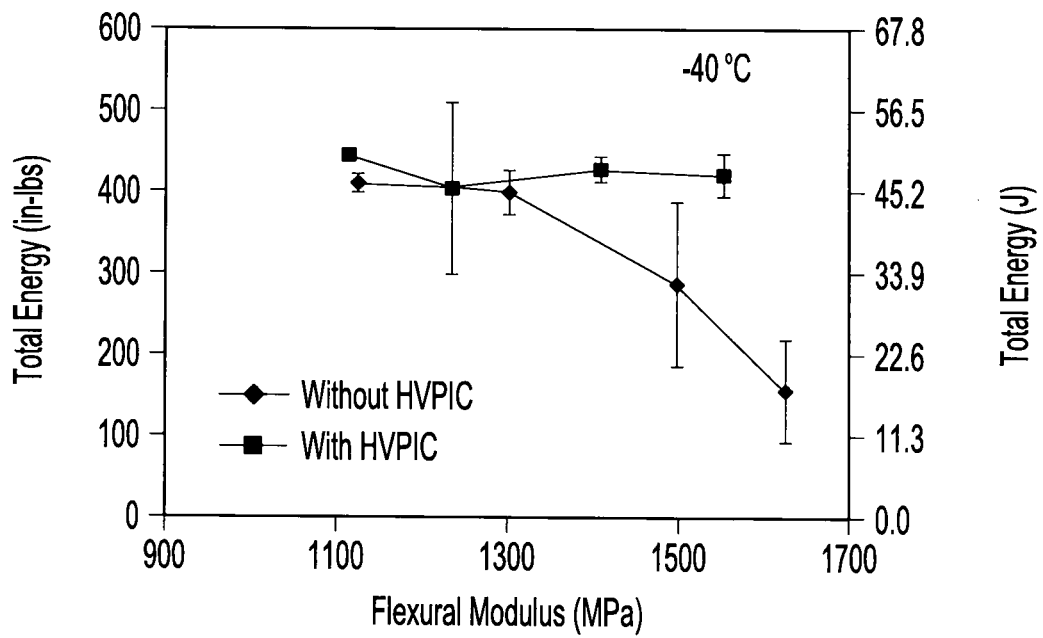

The mechanical properties of the filled TPO compositions (TPO-1 to TPO-8) are given in TABLE 3B. FIGS. 6A, 6B, 6C and 6D illustrate the relationship between the impact strength, measured using Notched Izod Impact test at 20° C., 0° C., −20° C., and −30° C., respectively and the flexural modulus for these compositions. EXAMPLES TPO-1, 3, 5, and 7 made using a masterbatch including the high viscosity polypropylene impact copolymer are designated by the square symbol and COMPARATIVE EXAMPLES TPO-2, 4, 6, and 8 made using a masterbatch without the high viscosity polypropylene impact copolymer are designated by the diamond symbol. FIGS. 7A and 7B illustrate the relationship between the percent of samples which are ductile, as measured by DART IMPACT Testing at −30° C. and −40° C. respectively and the flexural modulus for these compositions. FIGS. 7C and 7D illustrate the relationship between the total energy, as measured by DART IMPACT testing at −30° C. and −40° C. respectively and the flexural modulus for these compositions. In FIGS. 7A, 7B, 7C, and 7D, EXAMPLES TPO-1, 3, 5, and 7 made using a masterbatch including the high viscosity polypropylene impact copolymer are designated by the square symbol and COMPARATIVE EXAMPLES TPO-2, 4, 6, and 8 made using a masterbatch without the high viscosity polypropylene impact copolymer are designated by the diamond symbol. FIG. 7C illustrates that the percent ductile failure (DF) for the samples including a masterbatch containing the HVPIC and tested at −30° C. is given by the equation $DF>95-(0.1\times(M_F-1100))$, where $M_F$ is the flexural modulus in MPa and where $M_F$ ranges from about 1100 and 1600 MPa. For these samples, it is also found that $DF>95-(0.05\times(M_F-1100))$. The comparative examples do not meet the above criteria.

TABLE 3A

COMPOSITIONS OF FILLED TPO COMPOSITIONS

| | EX. TPO-1 | C.E. TPO-2 | EX. TPO-3 | C.E. TPO-4 | EX. TPO-5 | C.E. TPO-6 | EX. TPO-7 | C.E. TPO-8 |
|---|---|---|---|---|---|---|---|---|
| LVPP-2, weight percent | 95% | 95% | 90% | 90% | 85% | 85% | 80% | 80% |
| EX. MB-7, weight percent | 5% | | 10% | | 15% | | 20% | |
| C.E. MB-8, weight percent | | 5% | | 10% | | 15% | | 20% |
| Total (weight percent) | 100% | 100% | 100% | 100% | 100% | 100% | 100% | 100% |
| Flexural Modulus, MPa | 1113 | 1123 | 1234 | 1300 | 1407 | 1496 | 1553 | 1624 |
| Melt Flow rate (g/10 min) | 8.9 | 9.7 | 8.3 | 10.0 | 7.8 | 9.9 | 7.5 | 10.0 |

TABLE 3B

COMPOSITIONS OF FILLED TPO COMPOSITIONS

| | EX. TPO-1 | C.E. TPO-2 | EX. TPO-3 | C.E. TPO-4 | EX. TPO-5 | C.E. TPO-6 | EX. TPO-7 | C.E. TPO-8 |
|---|---|---|---|---|---|---|---|---|
| Instrumented Dart Impact | | | | | | | | |
| Ductility at −40° C., percent | 90 | 80 | 70 | 20 | 10 | 0 | 10 | 0 |
| Impact Energy, in-lb at −40° C. | 412 | 404 | 402 | 350 | 390 | 201 | 342 | 106 |
| Ductility at −30° C., percent | 100 | 90 | 90 | 40 | 90 | 10 | 70 | 0 |
| Impact Energy, in-lb at −30° C. | 443 | 410 | 404 | 399 | 428 | 286 | 422 | 156 |
| Notched Izod Impact Strength | | | | | | | | |
| at 23° C., ft·lbs/in | 6.64 | 6.28 | 6.51 | 5.54 | 6.34 | 4.72 | 6.22 | 3.95 |
| at 0° C., ft·lbs/in | 5.51 | 4.67 | 5.04 | 3.14 | 4.59 | 2.67 | 2.80 | 1.55 |
| at −15° C., ft·lbs/in | 2.01 | 1.71 | 1.60 | 1.63 | 1.46 | 0.90 | 1.33 | 0.90 |
| at −30° C., ft·lbs/in | 0.86 | 0.82 | 0.82 | 0.66 | 0.79 | 0.64 | 0.75 | 0.57 |
| Number of Tiger Strips per molded plaque | 0 | 0 | 0 | 8 | 6 | 9 | 7 | 11 |
| Remarks | No Tiger Stiping Visible | No Tiger Stiping Visible | No Tiger Stiping Visible | Light Tiger Striping | Very Light Tiger Striping | Tiger Stripes Visible | Light Tiger Striping | Tiger Stripes Highly Visible |

Examples TPO 9 and 11, and Comparative Examples 10 and 12

EX. TPO-9 and -11 and C.E. TPO-10 and -12 are filled TPO compositions prepared using the compositions given in TABLE 4. The masterbatch is dried at about 80° C. for 2 hours to remove moisture. The ingredients are dry blended to form a pellet mixture and injection molded according to the process described above for EX. TPO 1. SLEP-2 is an ethylene-octene copolymer having a melt flow rate of about 5 g/10 min and a density of about 0.87 g/cm³. SLEP-2 is commercially available from DOW CHEMICAL CO. under the designation of ENGAGE® 8200.

TABLE 4

FORMULATIONS OF FILLED TPO COMPOSITIONS

| | EX. TPO-9 | C.E. TPO-10 | EX. TPO-11 | C.E. TPO-12 |
|---|---|---|---|---|
| LVPP-1 | 47.3% | 47.3% | 47.3% | 47.3% |
| SLEP-2 | 21.0% | 21.0% | 21.0% | 21.0% |
| MB-9 | 31.7% | | | |
| MB-10 | | 31.7% | | |
| MB-11 | | | 31.7% | |
| MB-12 | | | | 31.7% |

The masterbatch and the polypropylene are dry blended at room temperature (i.e., at a temperature below the melting temperatures of the masterbatch and the polypropylene).

Comparative Examples C.E. TPO-13 and C.E. TPO-14

C.E. TPO-13 is prepared by adding pellets of an impact polypropylene LVPP-2 (which has 100% ductility at −30° C. and −40° C.) and pellets of a talc masterbatch which is free of HVPIC at a ratio of 88:12 to an injection molding machine. The pellets are melted and mixed in the screw and barrel of the injection molding machine and then C.E. TPO-13 is molded into plaques. The Molded plaques have a tiger stripe rating of about 4.0 to about 4.5. When tested for ductility at low temperature using the falling dart test, 0% of the samples were ductile at −40° C. and 10% of the samples were ductile at −30° C.

C.E. TPO-14 is prepared using the same process as C.E. TPO-13, except 6 weight percent pellets of HVPIC is added to the feed for the injection molding machine. C.E. TPO-14 is molded into plaques. The Molded plaques have a tiger stripe rating of about 2.5. When tested for ductility at low temperature using the falling dart test, 0% of the samples were ductile at −40° C. and 50% of the samples were ductile at −30° C. C.E. TPO-14 has minimal improvement in ductility. In comparison, EX. TPO-3 has no tiger striping visible and when tested for ductility at low temperature using the falling dart test, 70% of the samples were ductile at −40° C. and 90% of the samples were ductile at −30° C.

As discussed previously, desirably, the process of the present invention is substantially free of a step of compounding together the polymeric masterbatch, the low viscosity polypropylene and any third or other materials prior to the part fabrication step, and specifically a compounding step that includes a melt blending step of the materials. It will be appreciated that such requirement can still be met by employing dry blend steps at temperatures below the melting points of the materials. For example, it is possible that prior to introduction of the starting materials into a screw and barrel assembly herein, pellets of the materials may be dry mixed (e.g., by a mixing arm in a hopper). A suitable feeder, such as a gravimetric feeder (as discussed) may optionally be employed.

As can be seen, the teachings herein permit for the production of shaped thermoplastic articles that feature comparable or better performance characteristics relative to existing materials that are compounded prior to their introduction into a shaping apparatus (e.g., prior to introduction to a hopper of an injection molding machine). Advantageously, the materials are processed into resulting articles with a heat history that is substantially minimized as compared with articles made with previously compounded blends.

While a feature of the present invention may have been described in the context of only one of the illustrated aspects or embodiments, such feature may be combined with one or more other features of other aspects or embodiments, for any given application. Unless stated otherwise, dimensions and geometries of the various embodiments depicted herein are not intended to be restrictive of the invention, and other dimensions or geometries are possible. Plural steps can be provided by a single integrated step. Alternatively, a single step might be divided into separate plural. Moreover, the disclosure of "a" or "one" element or step is not intended to foreclose additional elements or steps.

It is understood that the above description is intended to be illustrative and not restrictive. Many embodiments or aspects as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. Unless otherwise stated, the term "essentially free of" in connection with a potential ingredient in a component or composition is intended to represent values <5 weight percent, <1 weight percent, <0.1 weight percent, <0.01 weight percent and <0.001 weight percent based on the total weight of the component or composition.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

As used herein the terms "polymer" and "polymerization" are generic, and can include either or both of the more specific cases of "homo-" and copolymer" and "homo- and copolymerization", respectively.

What is claimed is:

1. A polymeric composition comprising:
    a. at least about 5 weight percent inorganic filler based on the total weight of the polymeric composition;
    b. a high viscosity polypropylene impact copolymer having
        i. a highly crystalline portion, wherein the highly crystalline portion is present from about 20 weight percent to about 90 weight percent of the high viscosity polypropylene impact copolymer, and
        ii. a xylene soluble portion, wherein the xylene soluble portion is present from about 10 weight percent to about 80 weight percent of the high viscosity polypropylene impact copolymer, has a z-average molecular weight greater than about 1,500,000 Da, a number average molecular weight less than about 100,000 Da, and a polydispersity index greater than about 5; and
    c. a low viscosity substantially linear ethylene polymer (SLEP) having a polydispersity index less than about 3.5, and a melt flow rate greater than about 40 g/10 min as measured according to ASTM D-1238 at 190° C./2.16 kg.

2. The polymeric composition of claim 1, wherein the polymer composition is a polymeric masterbatch suitable for at-press blending with a polyolefin diluent to achieve a molded surface having low surface imperfections, and the concentration of the inorganic filler is at least about 35 weight percent based on the total weight of the polymeric masterbatch.

3. The polymeric masterbatch of claim 2 wherein the filler concentration is from about 35 weight percent to about 85 weight percent based on the total weight of the polymeric masterbatch.

4. The polymeric masterbatch of claim 3 wherein the filler comprises talc.

5. The polymeric masterbatch of claim 4, wherein at least 90 weight percent of the filler has a median particle size from about 0.1 to about 20 µm.

6. The polymeric masterbatch of claim 2, wherein the high viscosity polypropylene impact copolymer has a melt flow rate from about 0.4 to about 2.5 g/10 min as measured according to ASTM D-1238 at 230° C./2.16 kg.

7. The polymeric masterbatch of claim 2, wherein the xylene soluble portion of the high viscosity polypropylene impact copolymer has a z-average molecular weight from about 1,800,000 Da to about 3,500,000 Da.

8. The polymeric masterbatch of 7 wherein the polymeric masterbatch has a xylene soluble component, wherein the xylene soluble component has a z average molecular weight greater than about 1,000,000 Da.

9. The polymeric masterbatch of claim 8 wherein the SLEP is selected from the group consisting of an ethylene-propylene copolymer, an ethylene-butene copolymer, an ethylene-hexene copolymer, an ethylene-octene copolymer, and any combination thereof, and the SLEP has a melt flow rate greater than about 150 g/10 min as measured according to ASTM D-1238 at 190° C./2.16 kg.

10. The polymeric masterbatch of claim 8, wherein the high viscosity polypropylene impact copolymer has a melting temperature greater than about 140° C., and the xylene soluble portion is present at a concentration of 22 to about 55 weight percent based on the total weight of the polypropylene impact copolymer.

11. The polymeric masterbatch of claim 3, wherein the xylene soluble portion of the high viscosity impact copolymer has a polydispersity index greater than about 7.

12. The polymeric masterbatch of claim 3, wherein the polymeric masterbatch is in the form of pellets or granules.

13. The polymeric composition of claim 1, wherein the polymeric composition is a filled thermoplastic polyolefin composition wherein
the inorganic filler is present at a concentration from about 5 to about 30 weight percent based on the total weigh of the filled thermoplastic polyolefin composition;
and the polymeric composition includes a low viscosity polypropylene having a melt flow rate greater than about 4 g/10 min as measured according to ASTM D-1238 at 230° C. and a melting temperature greater than about 130° C.

14. The filled thermoplastic polyolefin composition of claim 13 wherein the high viscosity propylene impact copolymer is present at a concentration from about 1 to about 8 weight percent based on the total weigh of the filled thermoplastic polyolefin composition.

15. The filled thermoplastic polyolefin composition of claim 13 wherein the SLEP is present at a concentration greater than about 1 weight percent based on the total weight of the filled thermoplastic polyolefin composition.

16. A filled thermoplastic polyolefin composition of claim 15, wherein the composition further comprises a second SLEP having a melt flow rate less than about 35 g/10 min.

17. The filled thermoplastic polyolefin composition of claim 16 wherein the second SLEP is present at a concentration from about 3 to about 30 weight percent based on the total weight of the filled thermoplastic polyolefin composition.

18. The filled thermoplastic polyolefin composition of claim 13 wherein the low viscosity polypropylene is present at a concentration greater than about 30 weight percent based on the total weight of the filled thermoplastic polyolefin composition.

19. A process for manufacturing a molded article including at least one part having a masterbatch containing polymeric composition comprising the steps of:
a. melt blending at least 10 weight percent of a polymeric masterbatch of claim 2, and at least 40 weight percent of a diluent polypropylene having a melt flow rate greater than about 2.5 g/10 min as measured according to ASTM D-1238 at 230° C./2.16 kg to form a molten blend of the masterbatch containing polymeric composition; and
b. molding the masterbatch containing polymeric composition.

20. The process of claim 19 wherein the step of melt blending occurs in the screw of an injection molding machine; the step of molding the masterbatch containing polymeric composition includes a step of molding the molten blend; and the process does not include a step of melt compounding the polymeric masterbatch and the diluent polypropylene prior to the melt blending step.

* * * * *

UNITED STATES PATENT AND TRADEMARK OFFICE
CERTIFICATE OF CORRECTION

PATENT NO.         : 8,529,821 B2                                        Page 1 of 1
APPLICATION NO.    : 13/142966
DATED              : September 10, 2013
INVENTOR(S)        : Walia et al.

It is certified that error appears in the above-identified patent and that said Letters Patent is hereby corrected as shown below:

On Title Page 2, Item -56-

FOREIGN PATENT DOCUMENTS
delete
"EP 0 636 613 A1 2/1995"
insert
--EP 0 639 613 A1 2/1995--

Signed and Sealed this
Fifteenth Day of April, 2014

Michelle K. Lee
*Deputy Director of the United States Patent and Trademark Office*